United States Patent [19]
Nishiyama et al.

[11] Patent Number: 5,960,156
[45] Date of Patent: Sep. 28, 1999

[54] VIDEO CAMERA COMBINED WITH RECORDING AND REPRODUCING SYSTEM HAVING A CAMERA UNIT, A VIEWFINDER UNIT, AND A BATTERY UNIT ARRANGED IN A PROJECTION AREA OF A RECORDING AND REPRODUCING DECK UNIT

[75] Inventors: Takanori Nishiyama, Mitaka; Akira Takahashi, Hidaka; Hiroto Takita, Higashikurume; Toshiharu Watanabe, Kodaira; Takeshi Kawarai, Higashiibaraki-gun; Hisashi Shibata, Nagoya, all of Japan

[73] Assignee: Hitachi, Ltd., Tokyo, Japan

[21] Appl. No.: 07/938,841

[22] Filed: Aug. 31, 1992

[30] Foreign Application Priority Data

Sep. 4, 1991 [JP] Japan .................................... 3-223976

[51] Int. Cl.$^6$ ........................... H04N 5/225; H04N 5/247
[52] U.S. Cl. ........................... 386/118; 348/374; 348/376
[58] Field of Search ...................... 358/335, 310, 358/906, 909, 229, 209; 360/33.1, 35.1; 386/118; 348/374, 376; H04N 9/79, 5/76, 5/225, 5/30, 5/247

[56] References Cited

U.S. PATENT DOCUMENTS

| 4,862,280 | 8/1989 | Iida et al. | 358/229 |
| 4,894,723 | 1/1990 | Takaiwa | 358/909 |
| 5,157,512 | 10/1992 | Inada et al. | 358/906 |

FOREIGN PATENT DOCUMENTS

| 61-150474 | 7/1986 | Japan | H04N 5/225 |
| 2276374 | 11/1990 | Japan | H04N 5/225 |
| 368278 | 3/1991 | Japan | H04N 5/225 |

*Primary Examiner*—Thai Tran
*Attorney, Agent, or Firm*—Fay, Sharpe, Beall, Fagan, Minnich & McKee

[57] ABSTRACT

A video camera combined with a recording and reproducing system having a recording and reproducing deck unit having a generally flat shape, a camera unit, a viewfinder unit, and a battery unit. As viewed from the direction perpendicular to the widest surface of the recording and reproducing deck unit, the camera unit, viewfinder unit, and battery unit are arranged so that they are set almost in the projection area of the widest surface.

7 Claims, 33 Drawing Sheets

VIDEO CAMERA COMBINED WITH RECORDING AND REPRODUCING SYSTEM HAVING A CAMERA UNIT, A VIEWFINDER UNIT, AND A BATTERY UNIT ARRANGED IN A PROJECTION AREA OF A RECORDING AND REPRODUCING DECK UNIT

BACKGROUND OF THE INVENTION

The present invention relates to a video camera combined with a recording and reproducing system such as a video camera combined with a VTR (video tape recorder) or an electronic still camera. More specifically, the invention relates to a compact and portable video camera combined with a recording and reproducing system using, for example, a compact magnetic tape cassette or a magnetic disk.

It is desirable that a portable video camera combined with a recording and reproducing system be compact, light in weight, and operable. Various proposals have been made for such improvements. In Japanese Utility Model Application Laid-Open No. 63-152364 relating to a video camera combined with VTR, for example, a proposal that a grip unit having a camera unit is partially protruded on one side of a main body using a VHS compact cassette A; and viewfinder unit and a battery unit are installed in parallel with each other behind the main body.

It is desirable that a compact and portable video camera combined with a recording and reproducing system can be operated easily for imaging and stored, for example, in a case and carried easily for movement. Particularly, it is desirable that the video camera be as small and compact as possible for movement.

To miniaturize a video camera combined with a VTR, for example, it is necessary of course to miniaturize each of the main structures constituting the entire video camera such as a recording and reproducing deck unit which contains rotary heads and a drive motor and has a cassette tape storage chamber, a camera unit having a lens block comprising a plurality of lenses and an imaging unit, a viewfinder unit, and a battery unit. However, it is also necessary to contrive a means for arranging each structure.

On the basis of these points of view, in the above conventional example, the battery unit and the viewfinder unit are arranged in parallel with each other behind the main body for miniaturization in consideration of the arrangement of the viewfinder unit and the battery unit. In this example, however, the entire arrangement including the recording and reproducing deck unit and the camera unit is not taken into account. As a result, although the status behind the main body is partially neat, the entire arrangement is not good because the grip unit is partially protruded on one side of the main body and the design and storing capability are questionable. Furthermore, since the viewfinder unit and the battery unit are arranged behind the main body, the longitudinal length is excessive.

An object of the present invention is to provide a video camera combined with a recording and reproducing system which has a shape that can be made as small and compact as possible for movement or storage, that is, an almost even and compact shape (for example, the cassette size or disk size) including the recording and reproducing deck unit, camera unit, viewfinder unit, and battery unit which is as close to the size of a minimum capacity unit of recording medium (for example, a tape cassette or magnetic disk) as possible and which can be handled and operated easily for imaging.

Another object of the present invention is to provide a video camera combined with a recording and reproducing system which can be handled and operated easily for imaging and which has an almost even and compact shape (for example, the cassette size or disk size) which is as close to the size of a minimum capacity unit of recording medium (for example, a tape cassette or magnetic disk) as possible during no-imaging.

SUMMARY OF THE INVENTION

To accomplish the first object, according to the present invention, in a video camera combined with a recording and reproducing system including a recording and reproducing deck unit, camera unit, viewfinder unit, and battery unit, as viewed from the direction perpendicular to the widest surface of the flat recording and reproducing deck unit, the camera unit, viewfinder unit, and battery unit are arranged so as to be set almost on one side or two sides in the projection area of the above surface.

In this case, the recording and reproducing deck unit may be a video tape recorder or a magnetic disk unit. Furthermore, the viewfinder unit may be arranged at the upper part of one side of the recording and reproducing deck unit, and the camera unit at the center, and the battery unit at the lower part. Furthermore, as viewed from the optical axis direction, a printed circuit board may be arranged around the viewfinder unit and battery unit so that the width of the camera unit, the width of the above viewfinder unit including the printed circuit board, and the width of the above battery unit including the printed circuit board almost match with each other. Furthermore, at least the viewfinder unit may be arranged so that it can move freely.

To accomplish the second object, according to the present invention, in a video camera combined with a recording and reproducing system which has a shape such that the status during imaging is different from the status during no-imaging, as viewed from the direction perpendicular to the widest surface of the flat recording and reproducing deck unit, the camera unit, viewfinder unit, and battery unit are arranged so as to be set almost in the projection area of the above surface during no-imaging. Furthermore, at least an optical axis changing means for changing the optical axis of the camera may be installed in the camera unit or at least an optical axis changing means for changing the viewfinder optical axis may be installed in the viewfinder unit.

Furthermore, the above viewfinder unit may be a display unit using a cathode-ray tube or a thin display unit using a liquid crystal display device (LCD).

According to the present invention, since as viewed from the direction perpendicular to the widest surface of the flat recording and reproducing deck unit, the camera unit, viewfinder unit, and battery unit are set almost on one side or two sides in the projection area of the above surface, the shape of the entire video camera can be made almost even and as close to the size of a minimum capacity unit of recording medium (for example, a tape cassette or magnetic disk) as possible. Furthermore, the operation switch or the display unit may be arranged on the surface of the main body on the side of an operator so that he can easily see it.

Furthermore, by arranging the viewfinder unit at the upper part of one side of the recording and reproducing deck unit, the camera unit at the center, and the battery unit at the lower part and furthermore arranging printed circuit boards around the viewfinder unit and battery unit, the shape of the entire video camera can be made almost even and well balanced in weight.

Furthermore, by arranging at least the viewfinder unit so that it can move freely, the viewfinder unit can move according to the imaging posture.

Furthermore, according to the present invention, in a video camera combined with a recording and reproducing system which has a shape such that it is different between during imaging and during no-imaging, for example, in a video camera combined with VTR wherein the camera unit and viewfinder unit are installed so that they can move freely, as viewed from the direction perpendicular to the widest surface of the flat recording and reproducing deck unit, the camera unit and viewfinder unit are set almost in the projection area of the above surface during no-imaging, so that the shape of the entire video camera can be made almost even and as close to the size of a minimum capacity unit of recording medium (for example, a tape cassette) as possible.

Furthermore, by arranging an optical axis changing means in the camera unit and the viewfinder unit respectively, the camera unit, viewfinder unit, and battery unit can be arranged on the widest surface of the flat recording and reproducing deck unit in various combinations.

Furthermore, by using a thin display unit as a viewfinder unit, an image of an object can be confirmed on the prolonged line of the optical axis of the camera.

DETAILED DESCRIPTION OF THE PREFERRED EMBODIMENTS

[First embodiment]

FIGS. 1 to 6 and FIGS. 45 to 50 show a video camera combined with VTR according to the first embodiment of the present invention.

Figure 1:
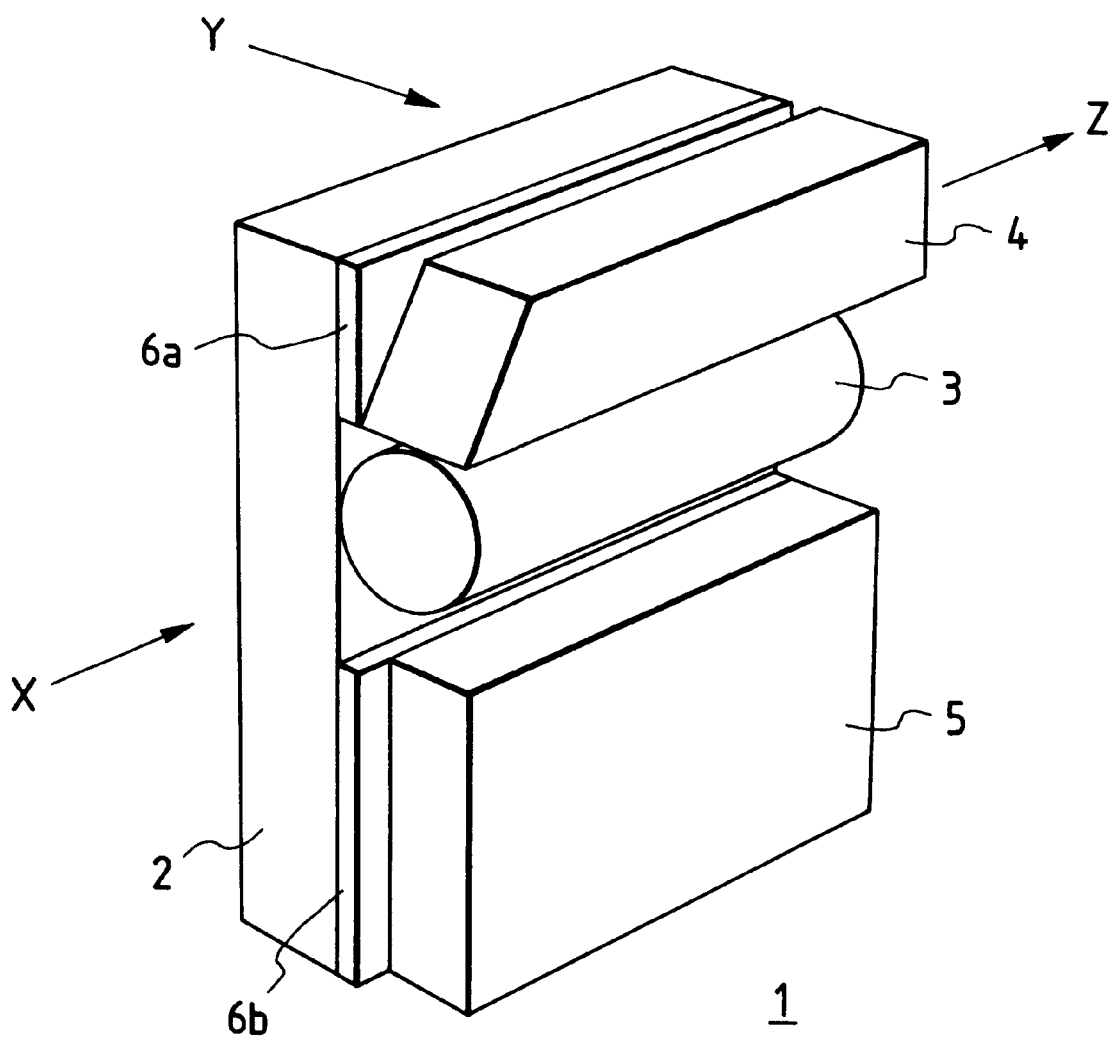
FIG. 1 is a perspective view showing the general structure of a first embodiment of the present invention.

First, the arrangement of each unit of this embodiment will be explained with reference to FIGS. 1 and 5. In FIG. 1, a reference numeral 1 generally denotes the main body of a video camera combined with VTR which comprises a recording and reproducing deck unit 2 having a rotary head 85 and a drive motor (not shown in the drawing), a camera unit 3 having a lens block unit combining a plurality of lenses and an imaging unit, a viewfinder unit 4, and a battery unit 5. The arrow X denotes the optical axis of the camera incoming into the camera unit 3, and the arrow Z denotes the optical axis of the viewfinder from the viewfinder unit 4, and the arrow Y denotes the direction from which the widest surface of the flat recording and reproducing deck unit 2 is viewed. Hereinafter, the recording and reproducing deck unit is abbreviated just to the deck unit.

The deck unit 2 is used for a miniature tape cassette and arranged so that the widest surface of the deck unit 2 is in the transverse direction and the longitudinal direction is vertical as viewed from the direction of the optical axis X of the camera. The camera unit 3, the viewfinder unit 4 arranged above the camera unit 3, and the battery unit 5 arranged under the camera unit 3 are mounted on the right of the deck unit 2 as viewed from the direction of the optical axis X of the camera, and arranged vertically so that the longitudinal directions thereof are horizontal, and arranged so that as viewed from the direction (direction of the arrow Y) perpendicular to the widest surface of the flat deck unit 2, they are set almost in the projection area of the above surface. The viewfinder unit 4 is arranged above the camera 3 so as to minimize the distance by which the main body 1 is moved up so as to reach the eye position and the battery unit 5 is arranged under the camera unit 3 in consideration of the weight balance.

Reference numerals 6a and 6b denote printed circuit boards. The printed circuit board 6a is arranged between the deck unit 2 and the viewfinder unit 4 and the printed circuit board 6b is arranged between the deck unit 2 and the battery unit 5.

Figure 5:
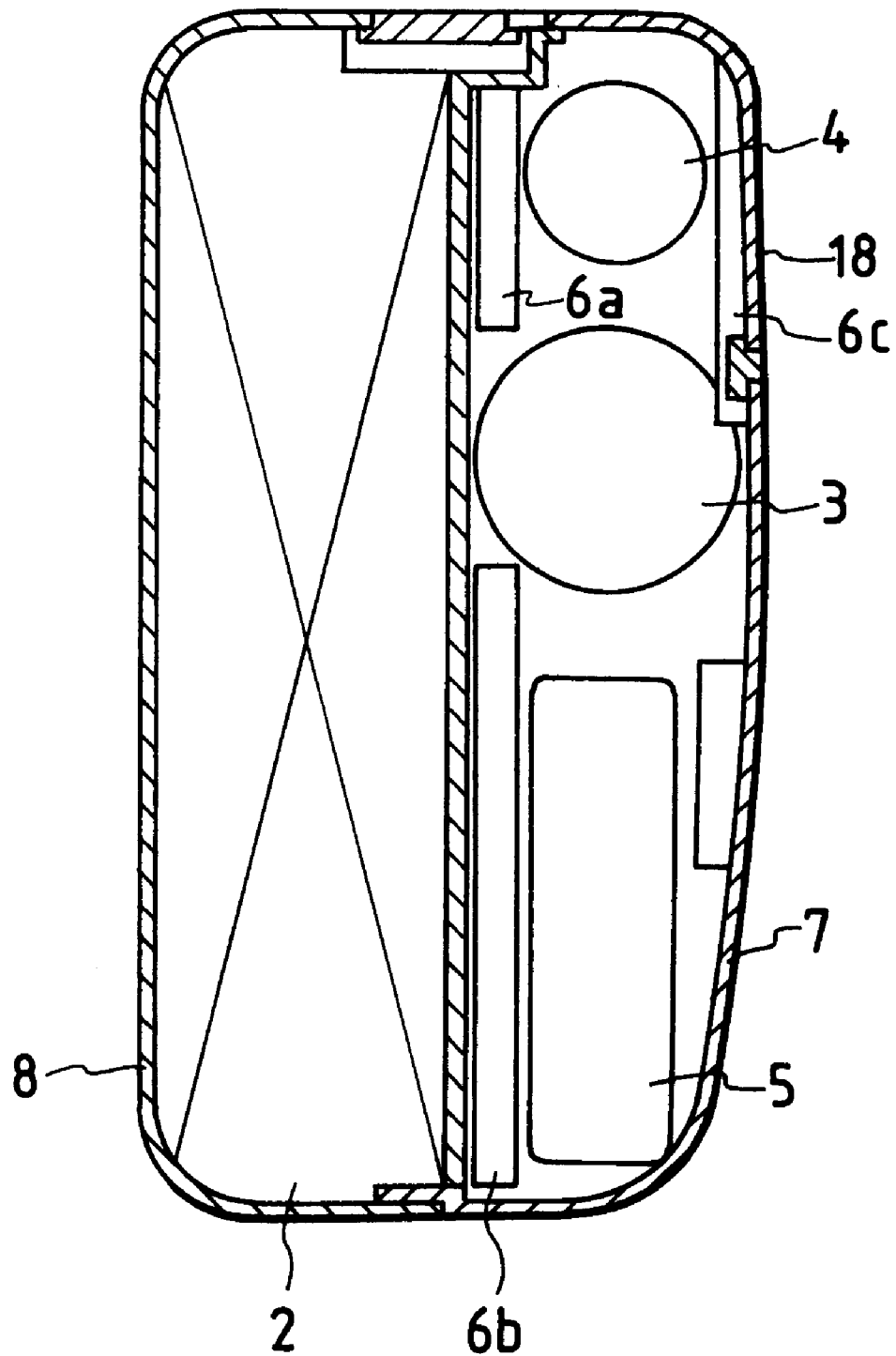
FIG. 5 is a sectional view taken on A—A line of FIG. 2.

In FIG. 5, a reference numeral 7 denotes a first housing for covering the camera unit 3, the viewfinder unit 4, and the battery unit 5 and 8 a second housing for covering the deck unit 2. 6a and 6b denote printed circuit boards as mentioned above and 6c an operation switch printed circuit board and a display unit printed circuit board. In the drawing, the camera unit 3 covered with the housing 7 is wider than the viewfinder unit 4 and the battery unit 5 (as viewed from the direction of the optical axis X of the camera). Therefore, no printed circuit board is arranged between the camera unit 3 and the deck unit 2, and the printed circuit boards 6a and 6c are arranged on both sides of the viewfinder unit 4, and the printed circuit board 6b is arranged between the battery unit 5 and the deck unit 2. By this arrangement, the total thickness is minimized, the internal dead space is eliminated, and the housing 7 is made almost even.

Figure 2:
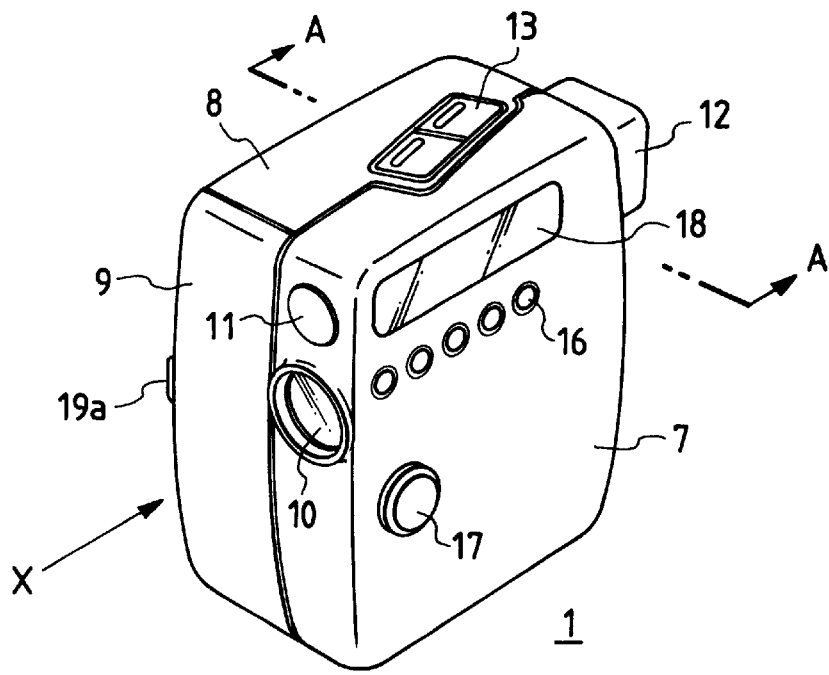
FIG. 2 is a perspective view of the embodiment shown in FIG. 1, showing the front, top, and right side thereof.
Figure 3:
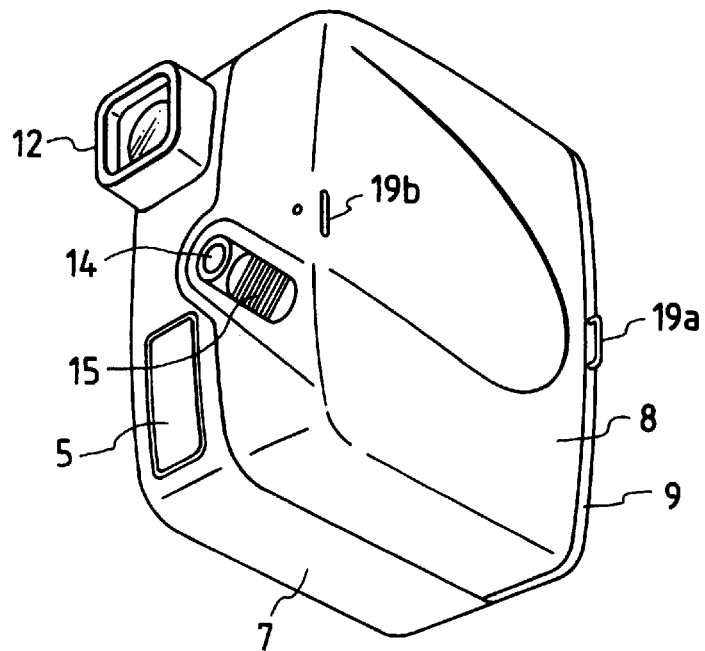
FIG. 3 is a perspective view of the embodiment shown in FIG. 1, showing the rear, bottom, and left side thereof.
Figure 4:
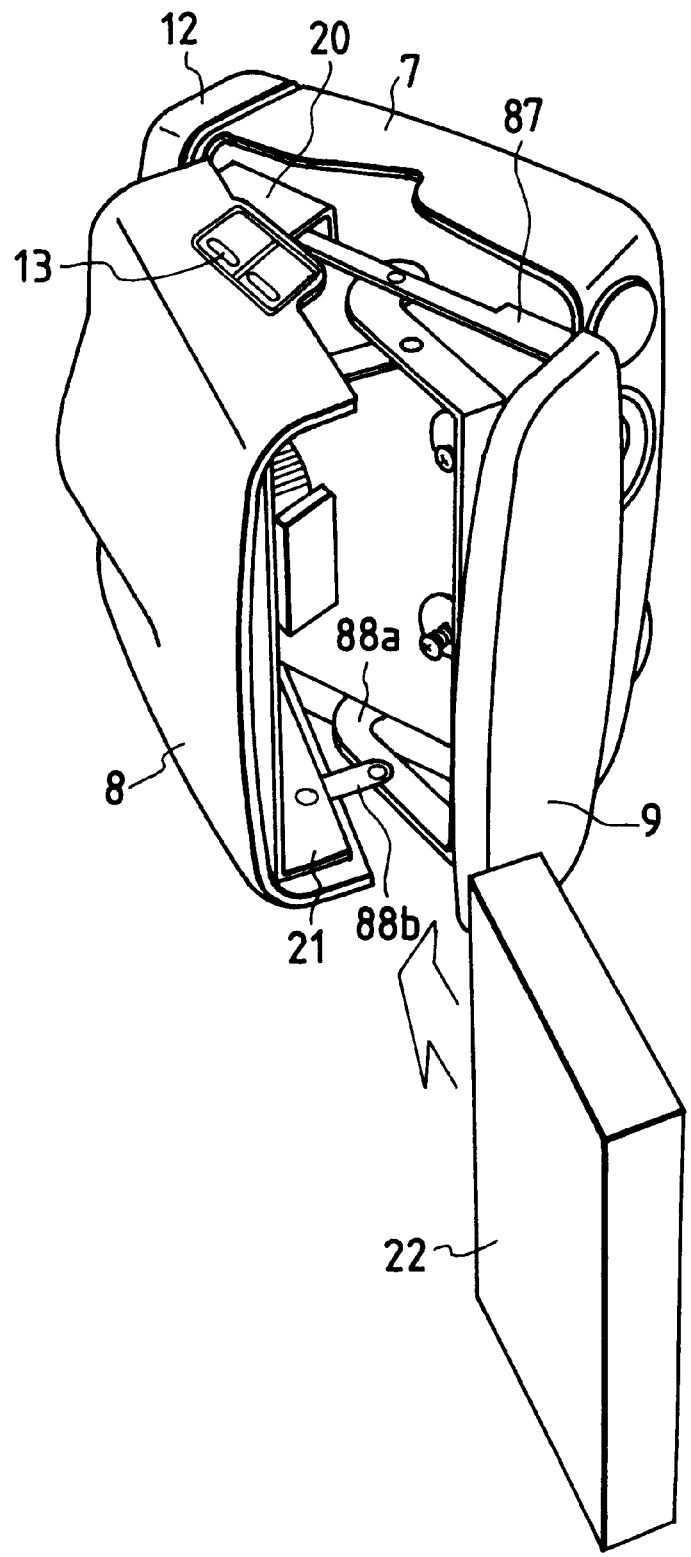
FIG. 4 is a perspective view showing the appearance of the embodiment shown in FIG. 1 when a tape cassette is inserted.
Figure 49:
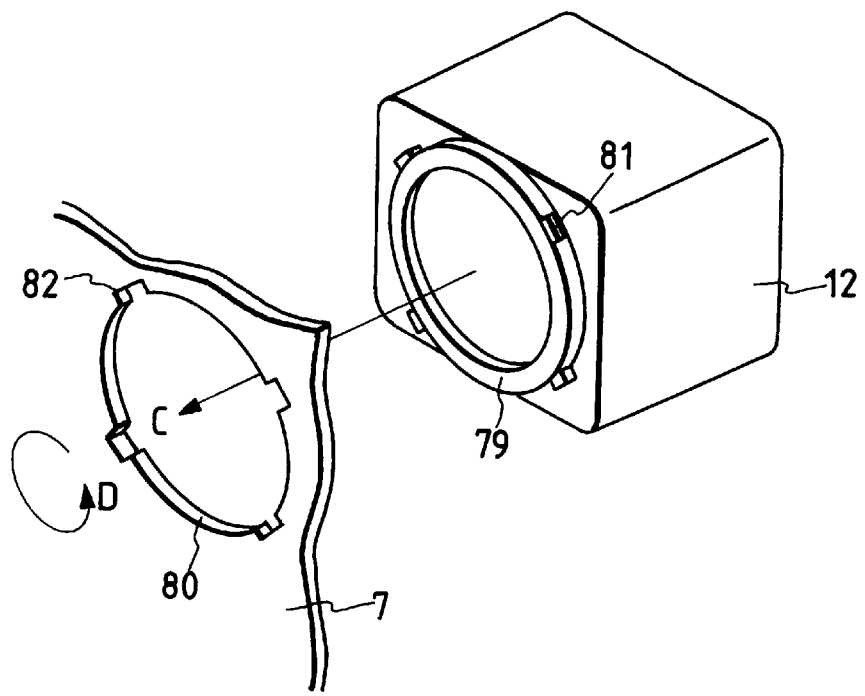
FIG. 49 is a perspective view of the first embodiment of the present invention showing the eye cup mounting structure.

Next, the appearance of this embodiment will be explained with reference to FIGS. 2 and 3. Reference numerals 7, 8, and 9 denote a first, a second, and a third housing and the housings 7, 8, and 9 constitute a housing for the main body 1. A reference numeral 10 denotes a lens installed on the front of the camera unit 3 and 11 a mike arranged above the lens 10. A reference numeral 12 denotes an eye cup. The structure thereof is such that, as shown in FIG. 49, by inserting a mounting ring 70 mounted to the eye cup 12 into an eye cup mounting hole 80 formed in the housing 7 behind the viewfinder unit 4 in the direction of the arrow C and furthermore rotating it in the direction of the arrow D, a stopper pawl 81 mounted to the mounting ring 70 is fitted into the eye cup mounting hole 80 via a stopper hole 82 and the eye cup 12 is attached to the main body 1 so that it can be freely attached or removed. A reference numeral 13 denotes a zooming button which comprises two buttons for shifting the zooming operation of the lens 10 to the telescopic side or to the wide view side by a zooming motor (not shown in the drawing) installed in the camera unit 3. A reference numeral 14 denotes a start/stop button which is made operable by operating a maloperation prevention lock button 15 which is installed near it. A reference numeral 16 denotes an operation switch for serving both as a video (reproducing) and a camera (imaging) switch which is switched by operating a video/camera changing button 17. Furthermore, the video/camera changing button 17 switches the operation switch 16 to Video (reproducing) or Camera (imaging) and also serves as a changing button for the power switch function or the eject button function for inserting or removing a tape cassette 22. A reference numeral 18 denotes a display unit and 5 a battery unit which is inserted from the back of the main body. Reference numerals 19a and 19b denote metal fittings for a belt for supporting the main body.

Figure 45:
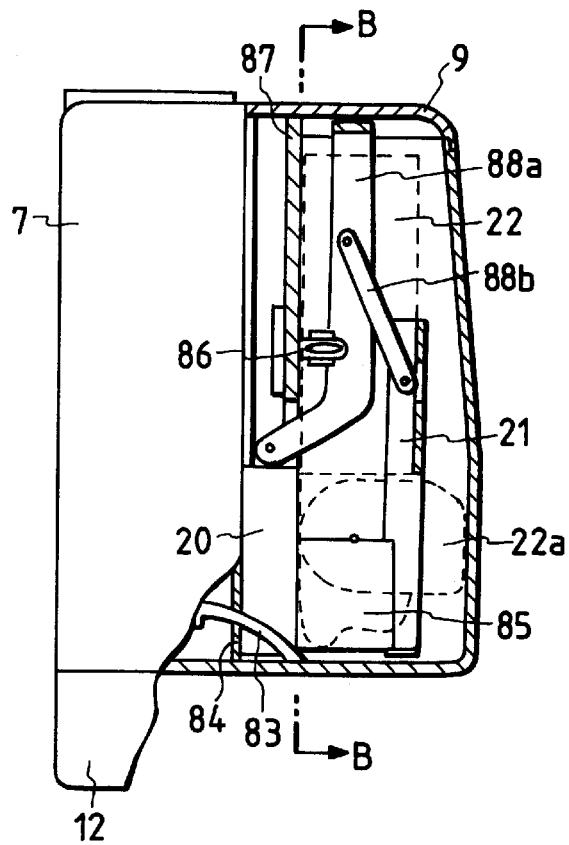
FIG. 45 is a sectional view of the essential section of the first embodiment of the present invention showing the general structure when a tape cassette is inserted or removed.
Figure 46:
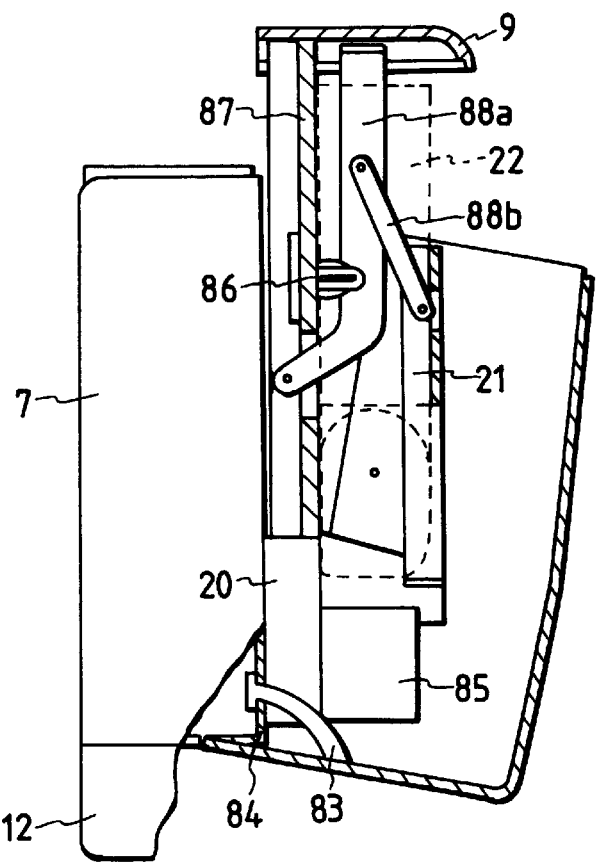
FIG. 46 is a sectional view of the essential section of the embodiment shown in FIG. 45 when the tape cassette is inserted or removed with the housing being open.
Figure 47:
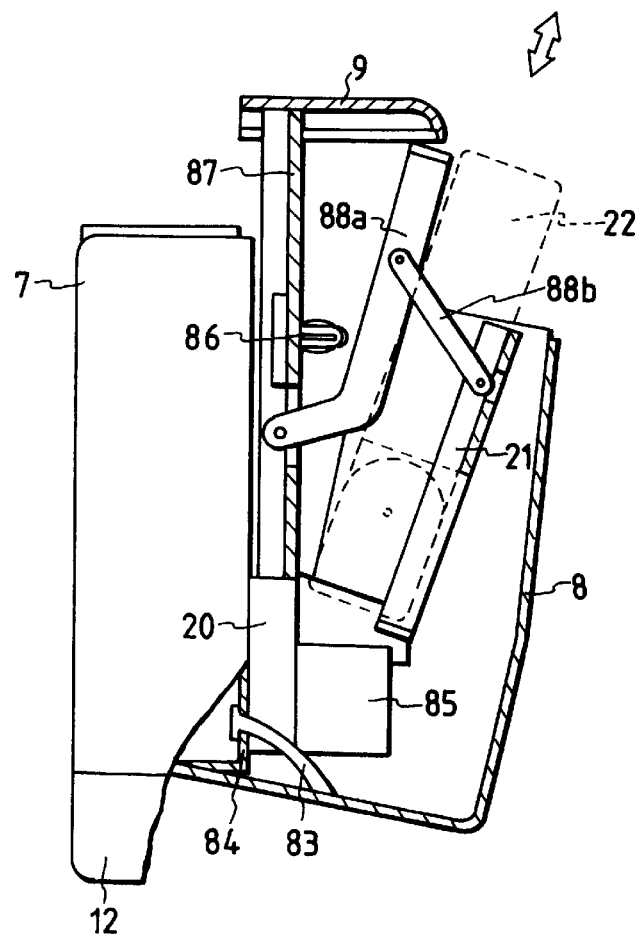
FIG. 47 is a sectional view of the essential section of the structure shown in FIG. 46 showing the status when the tape cassette is inserted or removed.
Figure 48:
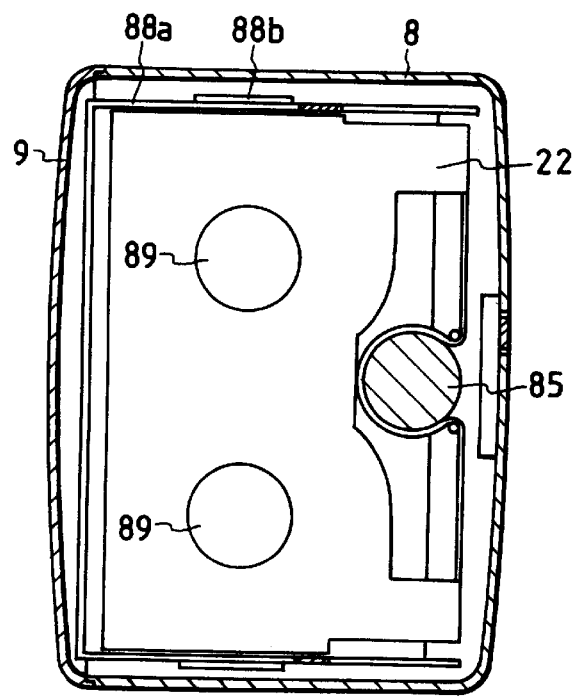
FIG. 48 is a B—B sectional view of the essential section of the embodiment shown in FIG. 45.

Next, the structure for inserting or removing the tape cassette 22 will be explained with reference to FIG. 4 and FIGS. 45 to 48. First, since the deck unit 2 of this embodiment is structured so that it is as close to the size of the widest surface of the flat tape cassette 22 as possible, the rotary head 85 gets into the tape cassette 22 with tape wound as shown in FIG. 48. In this state, as shown in FIG. 45, the tape cassette 22 indicated by a dotted line is guided by a tape cassette guide 21 so that a tape reel 89 gets into a cassette lid 86 mounted to an elevator plate 87. The tape cassette 22 is loaded in the deck unit 2 so that a tape cover 22a of the tape cassette 22 is opened in this status. The bottom of the tape cassette guide 21 is born by the elevator plate 87 so that the tape cassette guide 21 can rotate freely around the bottom thereof (on the drawing) and the top thereof is born indirectly by the elevator plate 87 via movable plates 88a and 88b. Furthermore, the housing 9 is fixed to the top of the elevator plate 87. In the drawing, furthermore, a circular rotary rail 83 fixed to the inside of the bottom (on the drawing) of the housing 8 slides through a guide hole 84 so that the top (on the drawing) of the housing 8 opens a around the bottom thereof (on the drawing).

To load or unload the tape cassette 22, the video/camera changing button 17 which serves as an eject button is operated first in the state shown in FIG. 45 so as to operate an elevator mechanism 20 having a gear mechanism. By moving up (on the drawing) the elevator plate 87 equipped with the housing 9 by the above elevator mechanism 20, the tape cassette 22 supported to the above elevator plate 87 by the tape cassette guide 21 moves up. The top of the housing 8 is opened in this status and the video camera enters the status shown in FIG. 46. When the tape cassette guide 21 moves up, it opens the top thereof, removes the tape reel 89 of the tape cassette from the cassette lid 86, and enters the status shown in FIG. 47 so that the cassette can be removed or inserted. To load the cassette tape 22, the tape cassette 22 is loaded into the tape cassette guide 21 and the housing 8 is closed so as to close the tape cassette guide 21, and the tape cassette 22 is loaded by the elevator mechanism 20, and the tape is wound round the rotary head 85.

Figure 6A:
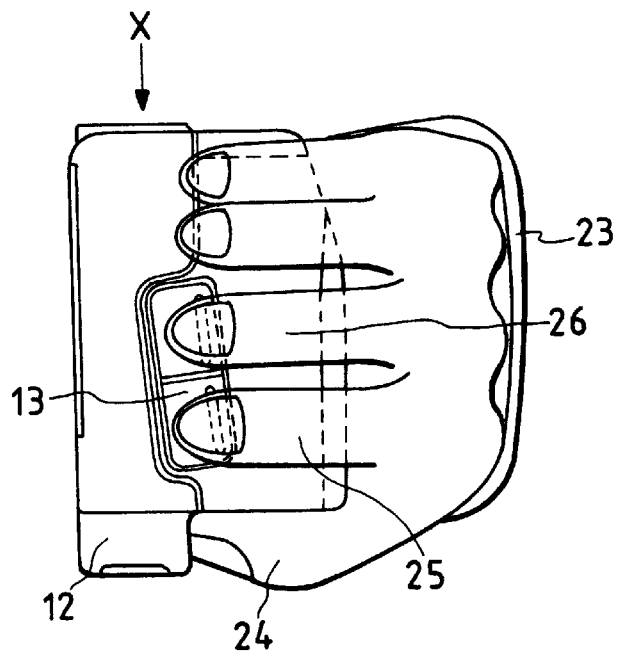
FIGS. 6(a) and 6(b) are drawings for explaining the use status of the embodiment shown in FIG. 1.
Figure 6B:
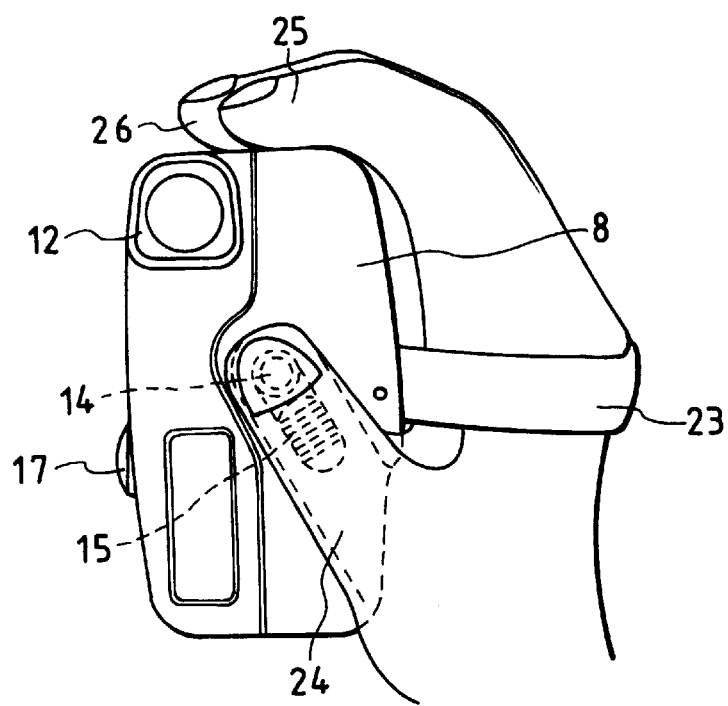

Next, the supporting and operating method for the main body 1 for imaging will be explained with reference to FIGS. 6(a) and 6(b). FIG. 6(a) is an illustration for the use status as viewed from the top and FIG. 6(b) is an illustration for the use status as viewed from the operator side. According to the supporting method of this embodiment, the main body 1 is supported by both hands or by one hand and a belt 23 as shown in FIGS. 6(a) and 6(b). In FIGS. 6(a) and 6(b), the video/camera changing button 17 is operated first so as to put the video camera into the imaging ready state. The lock button 15 and the start/stop button 14 are operated by a thumb 24 and the zooming button 13 is operated by a forefinger 25 and a middle finger 26.

In this embodiment, the battery unit 5 is arranged on the widest surface of the flat deck unit 2, so that the start/stop button can be arranged at the center of the back of the video camera as viewed from the optical axis direction. By doing this, not only the operability of the start/stop button 14 can be improved but also the main body 1 can be held and supported securely by the thumb 24 for operating the start/stop button 14, by the other fingers except the thumb 24 such as the forefinger 25 and the middle finger 26 for operating the zooming button 13, and by the palm of the hand. Furthermore, in this embodiment, a slightly uneven part is formed on the housing 8 so as to allow easy operation and handling.

Next, the circuit configuration of this embodiment will be explained with reference to FIG. 50. The drawing is a block diagram showing the circuit configuration of the essential section of the embodiment. In the drawing, a reference numeral 90 denotes a central processing unit (hereinafter called the CPU 90) for controlling the entire circuit system of the main body 1 which comprises various I/O interfaces, a ROM for storing the main control program and fixed data, and a micro-central processing unit for controlling the entire system and which is backed up by a battery. A reference numeral 91 denotes a power supply circuit for supplying currents to the entire circuit system of the main body 1 which is turned ON or OFF (the power supply state or the power breaking state) by the above CPU 90. A reference numeral 92 denotes a driving control circuit which receives a current from the above power supply circuit 91 and controls the driving of a driving mechanism 93 by a control signal from the above CPU 90 so as to drive the tape loading or unloading operation, the tape traveling operation, or the zooming motor operation. A reference numeral 94 denotes a tape detection means for detecting whether a tape cassette is loaded in the above deck unit 2 or not. The CPU 90 recognizes the presence or absence of a tape by a signal from the above detection means 94. A reference numeral 95 denotes a focus control circuit. When the focus control circuit 95 is put into the video mode by the video/camera changing button 17, the infrared auto-focus enters the operation state.

Furthermore, as mentioned above, the video/camera changing button 17 selects the power OFF mode, the video mode, the camera mode, or the ejection mode. In the power OFF mode, the battery 5 is removed and the power supply to the main body 1 is interrupted. When the battery 5 is remounted and the video camera enters the power supply ready state, the power supply to the main body 1 enters the stop state. In the video mode, the CPU 90 recognizes a signal from the operation switch 16 as a video function and operations as a so-called VTR (reproducing of a tape in the reproducing mode, fast feeding or rewinding of a tape in the fast feed or rewinding mode, etc.) can be performed. Simultaneously in this state, a video/audio control circuit 96 functions and a video/audio signal circuit 97 operates. In the camera mode, the CPU 90 recognizes a signal from the operation switch 16 as a camera function and operations as a so-called camera (backlight correction, shutter speed, white balance, etc.) can be performed. Furthermore, when the focus control circuit 95 is operated in this camera mode, the start/stop button 14 and the zooming button 13 can be operated. In the ejection mode, the CPU 90 allows the above driving control circuit 92 to at least unload a tape in the loading state.

In this embodiment, as mentioned above, as viewed from the direction perpendicular to the widest surface of the flat deck unit 2, the camera unit 3, the viewfinder unit 4, and the battery unit 5 are arranged so as to be set almost in the above surface, so that the entire video camera can be structured so as to be held by the palm of the hand and almost even. Particularly by the above arrangement, the battery unit 5 is not mounted behind the main body 1 as viewed from the direction of the optical axis X of the camera, so that the longitudinal length of the main body 1 and the eye cup 12 can be reduced by the thickness of the battery unit 5 and the start/stop button 14 can be arranged at the center of the back of the video camera so that it can be easily operated and the main body 1 can be easily supported.

Furthermore, by the above arrangement, the main body 1 can be formed in a box shape with the shorter side at the top which is almost even and slim. Therefore, although the main body 1 is conventionally carried with a shoulder belt for movement, it can be put into, for example, a pocket. Since the main body 1 is even and the eye cup 12 can be freely mounted or removed, the main body 1 can be put into or removed from the pocket smoothly. When storing the main body 1, it can be formed in an even and thin box shape. Therefore, according to this embodiment, the video camera does not require a special case using a cushioning material necessary to store a conventional video camera with an uneven structure in a stable state and can be put into, for example, a rectangular traveling bag or a drawer of a desk efficiently and stably without a dead space. Furthermore, since the main body 1 is almost even and the entire video camera is made compact, the damage of the main body 1 caused by movement or storage can be minimized.

Furthermore, in this embodiment, the printed circuit boards 6a and 6b are used as width adjustment members for the camera unit 3, the viewfinder unit 4, and the battery unit 5 which are different from each other in width. Therefore, the appearance can be made more even and compact. Furthermore, the printed circuit boards 6a and 6b are arranged at the locations closest to the structures such as the deck unit 2, that is, between the deck unit 2 and the camera unit 3, the viewfinder unit 4, and the battery unit 5. Therefore, each structure can be connected to the printed circuit boards 6a and 6b directly or with shortest cables.

Furthermore, since the housing of the main body 1 comprises three housings 7, 8, and 9, the structure is simple, and the assembly man hours can be reduced, and the total weight can be minimized. Furthermore, in this embodiment, by using the video/camera changing button 17, the operation switch 16 can be used both as a video (reproducing) and a camera (imaging) switch and furthermore as a power switch and an eject button. Since the number of switches can be reduced by using the operation switch as various switches as mentioned above, a large switch can be arranged on the compact main body 1, and the number of parts can be reduced, and the operability can be improved.

As mentioned above, according to this embodiment, the entire arrangement is good, and the design is satisfactory, and the storing capability and operability are superior.

[Second embodiment]

FIGS. 7 to 11 show a video camera combined with a VTR according to the second embodiment of the present invention. Members, locations, and arrows which are equal or equivalent to those shown in FIGS. 1 to 6 and FIGS. 45 to 50 are indicated by the same reference numerals and duplicated explanations are omitted.

Figure 7:
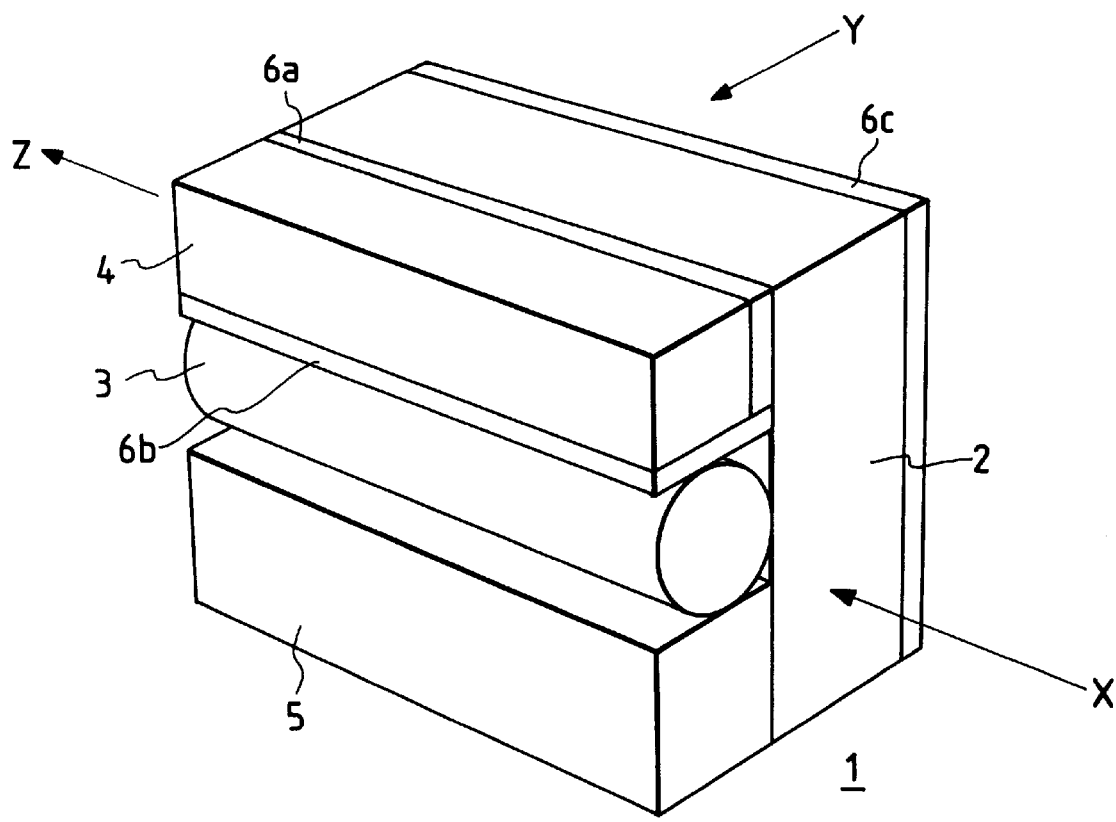
FIG. 7 is a perspective view showing the general structure of a second embodiment of the present invention.

Firstly, the arrangement of each unit of this embodiment will be explained with reference to FIG. 7. In the drawing, the deck unit 2 is arranged so that a direction perpendicular to the widest surface of the flat deck unit 2 is transverse and the longitudinal direction thereof is horizontal as viewed from the direction of the optical axis X of the camera. The camera unit 3, the viewfinder unit 4 arranged above the camera unit 3, and the battery unit 5 arranged under the camera unit 3 are mounted on the left of the deck unit 2 as viewed from the direction of the optical axis X of the camera, and arranged vertically so that the longitudinal directions thereof are horizontal, and arranged so that as viewed from the direction (direction of the arrow Y) perpendicular to the widest surface of the flat deck unit 2, they are set almost in the projection area of the above surface. Reference numerals 6a, 6b, and 6c denote printed circuit boards. The printed circuit board 6a is arranged between the deck unit 2 and the viewfinder unit 4, and the printed circuit board 6b is arranged between the camera unit 3 and the viewfinder unit 4, and the printed circuit board 6c is arranged on the right of the deck unit 2 as viewed from the direction of the optical axis X of the camera.

Figure 10:
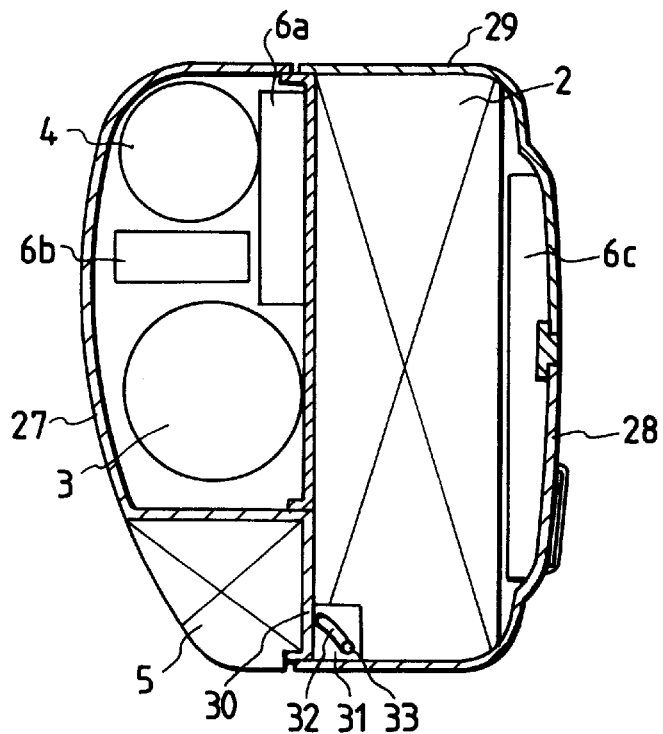
FIG. 10 is a sectional view taken on A—A line of FIG. 8.

In FIG. 10, a reference numeral. 27 denotes a first housing for covering the camera unit 3 and the viewfinder unit 4 and 28 and 29 a second housing and a third housing for covering the deck unit 2. In the drawing, the printed circuit boards 6a, 6b, and 6c are efficiently arranged as width adjustment members in the same way as with the first embodiment, so that the total thickness can be minimized, and the dead space is eliminated, and the main body 1 is structured so as to be more even. As shown in FIG. 10, the housing 28 is structured so that the top thereof is opened using the bottom thereof (on the drawing) as a rotation axis. In the drawing, when a shaft 33 mounted to the housing 28 is fitted into a groove 32 formed in a lip 31 mounted to an internal structure 30 and the shaft 33 moves in the groove 32, the housing 28 rotates using the bottom thereof as a rotation axis.

Figure 8:
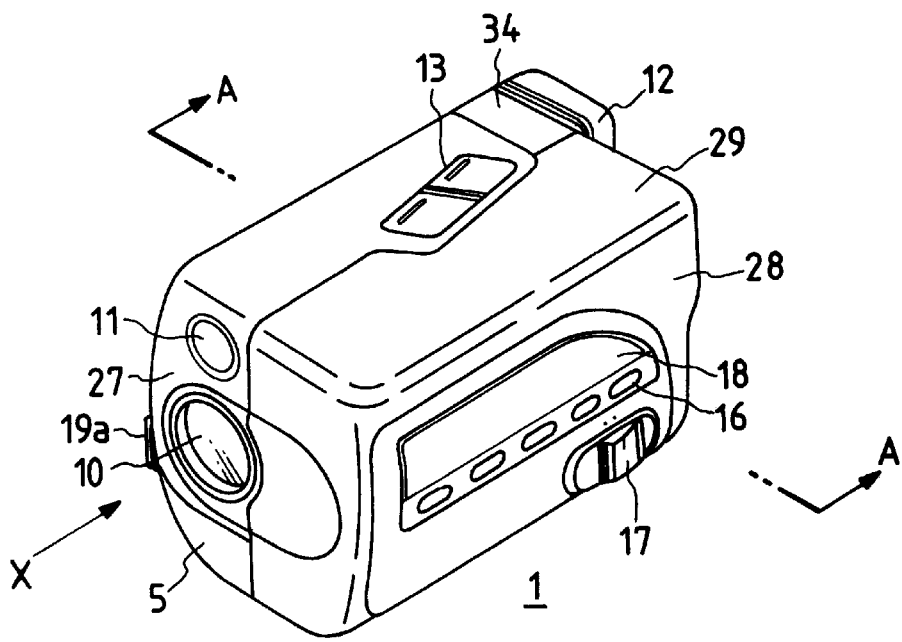
FIG. 8 is a perspective view of the embodiment shown in FIG. 7, showing the front, top, and right side thereof.
Figure 9:
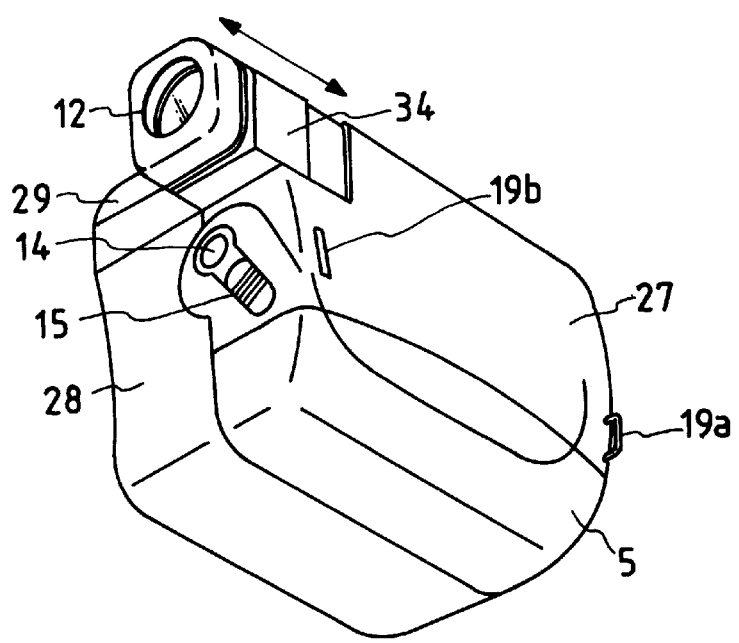
FIG. 9 is a perspective view of the embodiment shown in FIG. 7, showing the rear, bottom, and left side thereof.

Next, the appearance of this embodiment will be explained with reference to FIGS. 8 and 9. The housing of the main body 1 is comprised of the housings 27, 28, and 29 and the battery unit 5 which can be freely mounted or removed. As viewed from the direction of the optical axis X of the camera, the lens 10 and the mike 11 are arranged on the front of the main body 1, and the video/camera changing button 17, the operation switch 16 which is changed to a video switch or a cameral switch by the above video/camera changing button 17, and the display unit 18 are arranged on the right side, and the metal fittings 19a and 19b for the belt 23 for supporting the main body 1 is arranged on the left side, and the zooming button 13 is arranged on the top, and the eye cup 12, the lock button 15, and the start/stop button 14 are arranged on the back. The video/camera changing button 17 is also used both as a power switch and an eject button in the same way as with the first embodiment. The eye cup 12 is mounted to an eye cup mounting part 34, which is mounted behind the viewfinder unit 4 so as to expand or contract freely, so that it can be freely mounted or removed. The eye cup mounting part 34 covers the frame of the viewfinder unit 4 and is structured so as to slide on the frame.

Figure 11:
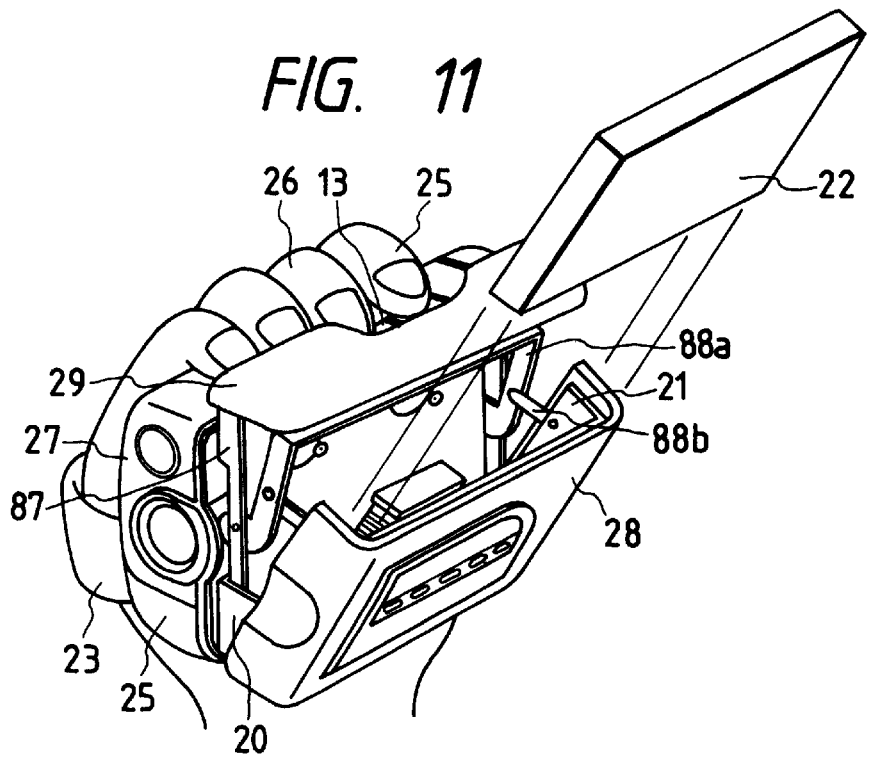
FIG. 11 is a drawing for explaining the use status of the embodiment shown in FIG. 7.

Next, the supporting and operating method for the main body for imaging will be explained with reference to FIG. 11. In this embodiment, the main body 1 is held so that the housing 27 and the battery unit 5 are held by right hand and supported by the belt 23 mounted to the metal fittings 19a and 19b. For imaging, the lock button 15 and the start/stop button 14 are operated by the thumb 24 (not shown in the drawing) and the zooming button 13 is operated by the forefinger 25 and the middle finger 26.

Next, loading or unloading of the tape cassette 22 will be explained with reference to the same drawing. The operation of this structure is the same as that shown in FIG. 4 and FIGS. 45 to 48. Firstly, the video/camera changing button 17 is operated so as to operate the elevator mechanism 20. By moving up (on the drawing) the elevator plate 87 equipped with the housing 29 by the above elevator mechanism 20, the tape cassette 22 supported to the above elevator plate 87 by the tape cassette guide 21 moves up. The top of the housing 28 is opened in this status using the shaft 33 at the bottom thereof as a rotation axis. When the tape cassette guide 21 moves up, it opens the top thereof, removes the tape reel 89 of the tape cassette from the cassette lid 86, and enters the status shown in FIG. 11 that the cassette can be removed or inserted. To load the cassette tape 22, the tape cassette 22 is loaded into the tape cassette guide 21 and the housing 28 is closed so as to close the tape cassette guide 21, and the tape cassette 22 is loaded by the elevator mechanism 20, and the tape is wound round the rotary head 85. Since the circuit configuration is the same as that in the first embodiment, the explanation will be omitted.

As mentioned above, in this embodiment, since the main body 1 is held on the camera unit 3 side, the tape cassette 22 can be replaced with the main body 1 held. As a result, the tape cassette 22 can be replaced easily and an imaging chance will not be lost due to exhausting of a tape. Furthermore, since the eye cup mounting part 34 can be freely expanded or contracted, the eye cup 12 can be adjusted in length according to the uneven status of the face of the operator or to his preference. As mentioned above, according to this embodiment, the main body 1 can be formed in a box shape with the longer side at the top which is short in height and almost even as viewed from the direction of the optical axis X of the camera, and the entire arrangement is good, and the design is satisfactory, and the storing capability and operability are superior.

[Third embodiment]

FIGS. 12 to 15 show a video camera combined with a VTR according to the third embodiment of the present invention. Members, locations, and arrows which are equal or equivalent to those shown in FIGS. 1 to 11 and FIGS. 45 to 50 are indicated by the same reference numerals and duplicated explanations are omitted.

Figure 12:
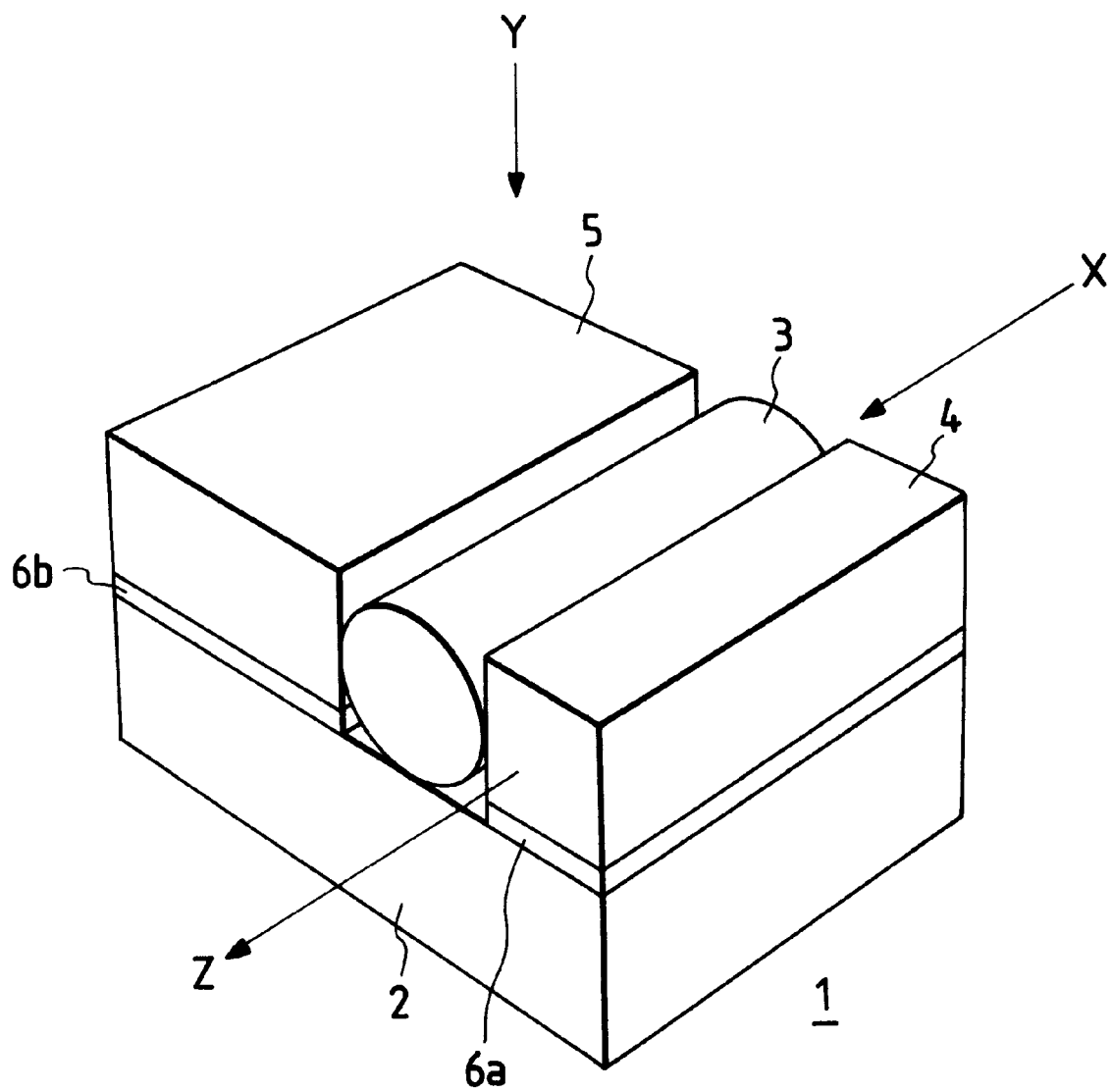
FIG. 12 is a perspective view showing the general structure of a third embodiment of the present invention.

In FIG. 12, the deck unit 2 is arranged so that a direction perpendicular to the widest surface of the flat deck unit 2 is vertical and the longitudinal direction thereof is transverse as viewed from the direction of the optical axis X of the camera. The camera unit 3, the viewfinder unit 4 arranged on the right of the camera unit 3, and the battery unit 5 arranged on the left of the camera unit 3 are mounted on the top of the deck unit 2 as viewed from the direction of the optical axis X of the camera, and arranged transversely so that the longitudinal directions thereof are horizontal, and arranged so that as viewed from the direction (direction of the arrow Y) perpendicular to the widest surface of the flat deck unit 2, they are set almost in the projection area of the above surface. Reference numerals 6a and 6b denote printed circuit boards. The printed circuit board 6a is arranged between the deck unit 2 and the viewfinder unit 4 and the printed circuit board 6b is arranged between the deck unit 2 and the battery unit 5.

Figure 13:
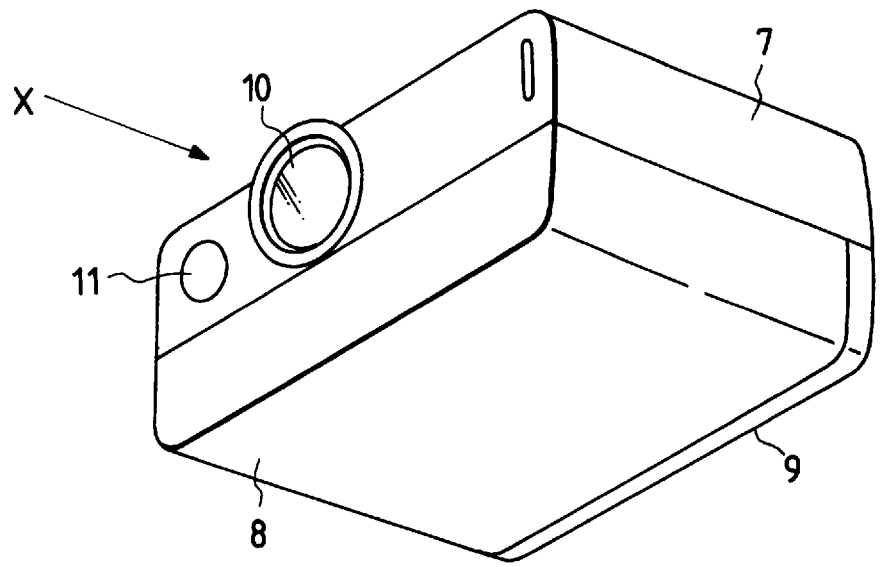
FIG. 13 is a perspective view of the embodiment shown in FIG. 12, showing the front, bottom, and right side thereof.
Figure 14:
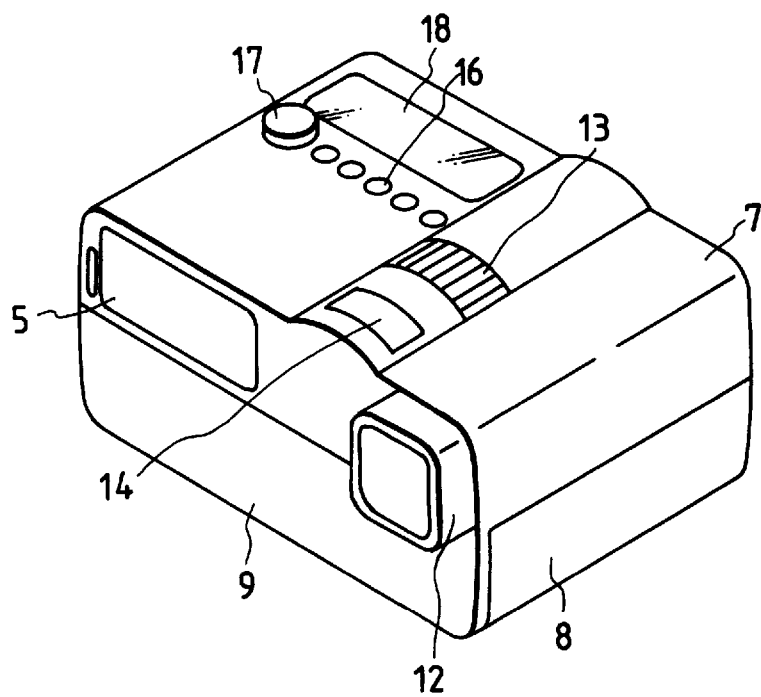
FIG. 14 is a perspective view of the embodiment shown in FIG. 12, showing the rear, top, and left side thereof.

Next, the appearance of this embodiment will be explained with reference to FIGS. 13 and 14. The main body 1 is covered with the housings 7, 8, and 9. As viewed from the direction of the optical axis X of the camera, the lens 10 and the mike 11 are arranged on the front of the main body 1, and the operation switch 16 which is changed to a video switch or a camera switch by the video/camera changing button 17, the display unit 18, the so-called rotary zooming knob 13 which adjusts the zooming status by rotating perpendicularly to the optical axis X of the camera, and the start/stop button 14 are arranged on the top, and the eye cup 12 which can be freely mounted or removed and the battery unit 5 which is inserted from the back side of the main body 1 are arranged on the back.

Figure 15A:
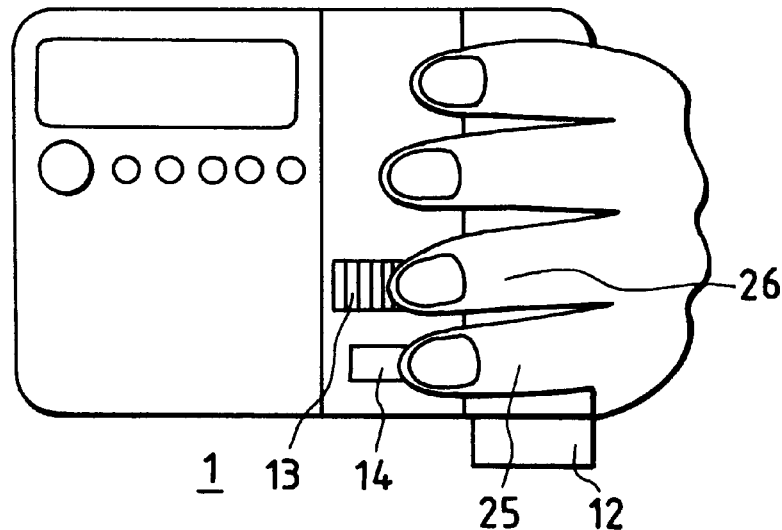
FIGS. 15(a) and 15(b) are drawings for explaining the use status of the embodiment shown in FIG. 12.
Figure 15B:
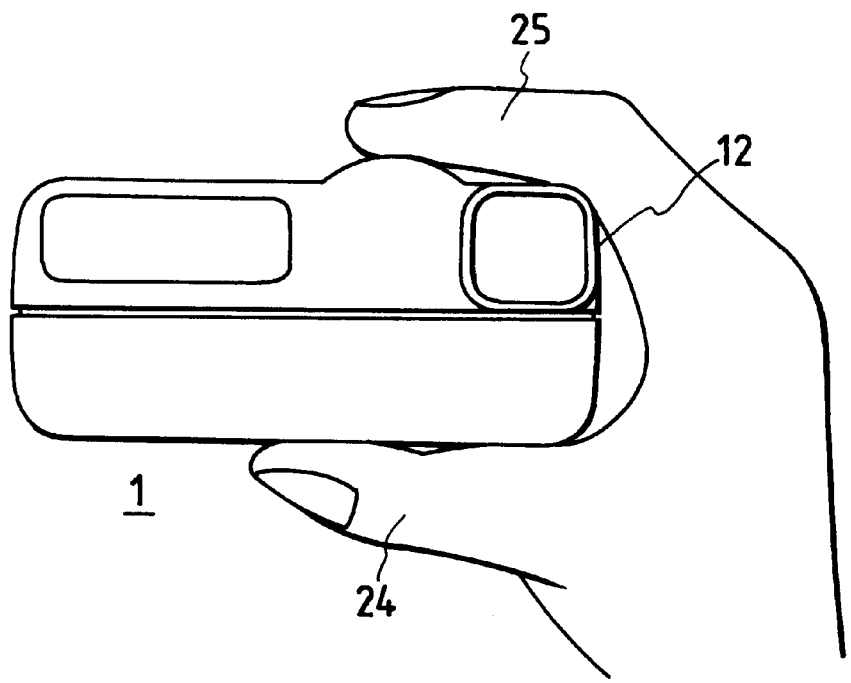

Next, the supporting and operating method for the main body for imaging will be explained with reference to FIGS. 15(a) and 15(b). FIG. 15(a) is an illustration for the use status as viewed from the top and FIG. 15(b) is an illustration for the use status as viewed from the operator side. In this embodiment, the main body 1 is held by the thumb 24 and the other fingers on the viewfinder unit 4 side. For imaging, the start/stop button 14 is operated by the forefinger 25 and the zooming button 13 is operated by the middle finger 26.

Furthermore, according to this embodiment, the battery unit 5 is not protruded from the back of the main body 1 like a conventional video camera. Therefore, there is no need to take contact of the battery unit 5 with the operator's face into account and the longitudinal length of the eye cup 12 can be shortened by the thickness of the battery unit 5. The tape cassette 22 is loaded or unloaded as shown in FIG. 4 and FIGS. 45 to 48 and the circuit configuration is the same as that shown in FIG. 50.

As mentioned above, according to this embodiment, the main body 1 can be formed in a thin box shape which is flat, almost even, and slim as viewed from the direction of the optical axis X of the camera, and the entire arrangement is good, and the design is satisfactory, and the storing capability and operability are superior. Furthermore, a conventional video camera requires a support belt for holding the main body 1 for imaging. However, in this embodiment, since the main body 1 is formed in a thin box shape, it can be held directly by hand, so that the support belt which is obstructive for storing is not necessary. Furthermore, when the video camera is used for video (reproduction), the main body 1 can be placed stably on the installation surface, so that the longitudinal length of the eye cup 12 can be shortened.

[Fourth embodiment]

FIGS. 16 to 20 show a video camera combined with a VTR according to the fourth embodiment of the present invention. Members, locations, and arrows which are equal or equivalent to those shown in FIGS. 1 to 15 and FIGS. 45 to 50 are indicated by the same reference numerals and duplicated explanations are omitted.

Figure 16:
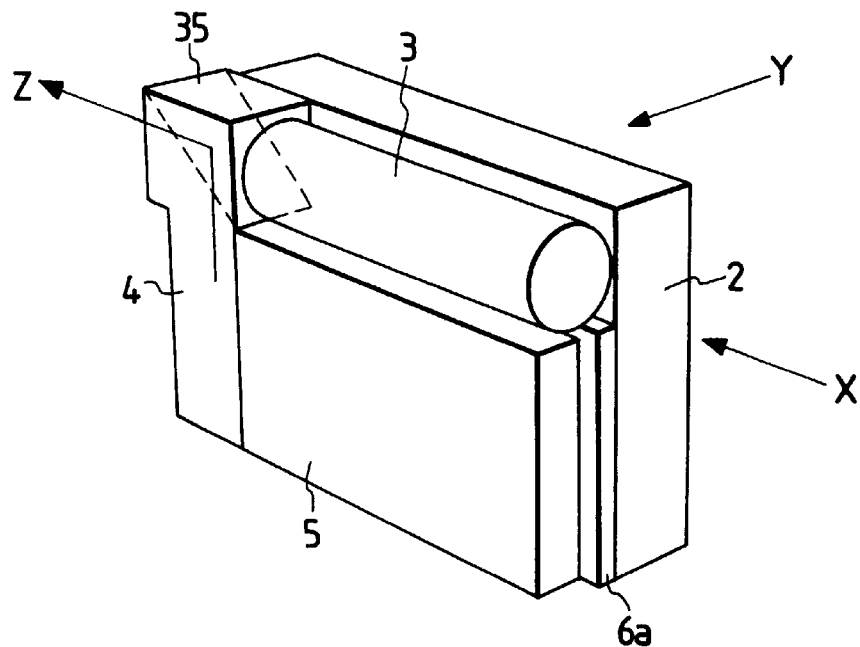
FIG. 16 is a perspective view showing the general structure of a fourth embodiment of the present invention.

In FIG. 16, the deck unit 2 is arranged so that a direction perpendicular to the widest surface of the flat deck unit 2 is transverse and the longitudinal direction thereof is horizontal as viewed from the direction of the optical axis X of the camera. On the left of the deck unit 2, the camera unit 3 is arranged on the forward upper part so that the longitudinal direction is horizontal, and the battery unit 5 is arranged on the forward lower part so that the longitudinal direction is horizontal, and the viewfinder unit 4 having an optical axis changing means 35 for changing the optical axis Z of the viewfinder is arranged on the rear so that the longitudinal direction is vertical under the condition that the units are in line with each other, and as viewed from the direction (direction of the arrow Y) perpendicular to the widest surface of the flat deck unit 2, the camera unit 3, the viewfinder unit 4, and the battery unit 5 are arranged so that they are set almost in the projection area of the widest surface of the flat deck unit 2. A reference numeral 6a denotes a printed circuit board arranged between the deck unit 2 and the battery unit 5.

Figure 19:
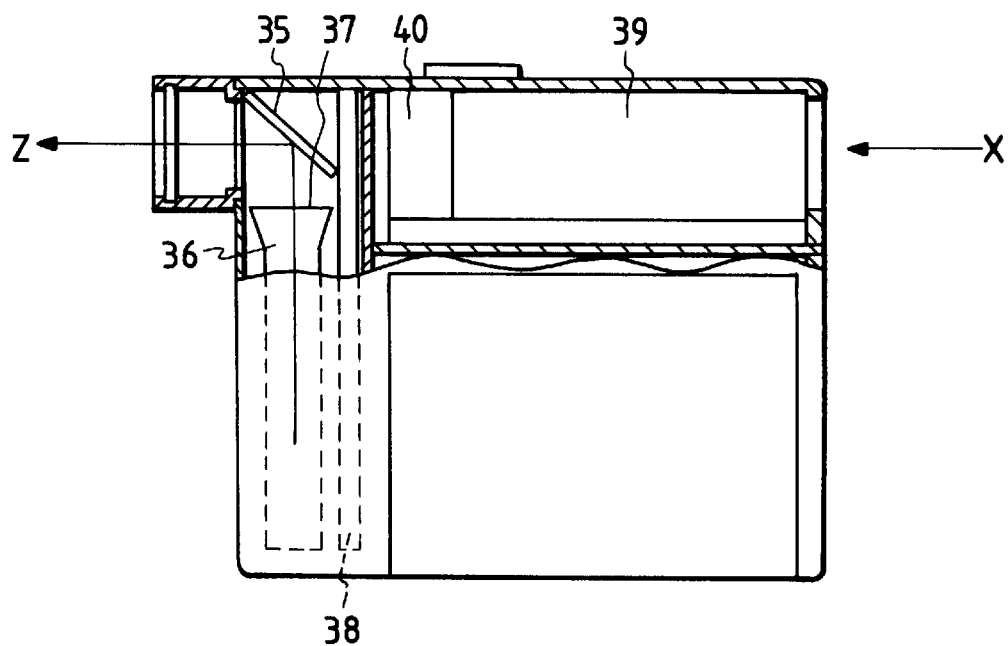
FIG. 19 is a side view with a partial section of the embodiment shown in FIG. 16.

The viewfinder unit 4 is structured, as shown in FIG. 19, such that a cathode-ray tube 36 is arranged vertically with a display screen 37 thereof up, and the optical axis Z of the viewfinder is refracted at 90° by the optical axis changing means 35 which is formed by a mirror arranged above the display screen 37, and images on the display screen 37 can be visually checked via the eye cup 12 which is arranged on the backward upper part so as to be freely mounted or removed. In FIG. 19, a reference numeral 38 denotes a printed circuit board of the viewfinder unit, 39 a lens block, and 40 an imaging unit.

Figure 17:
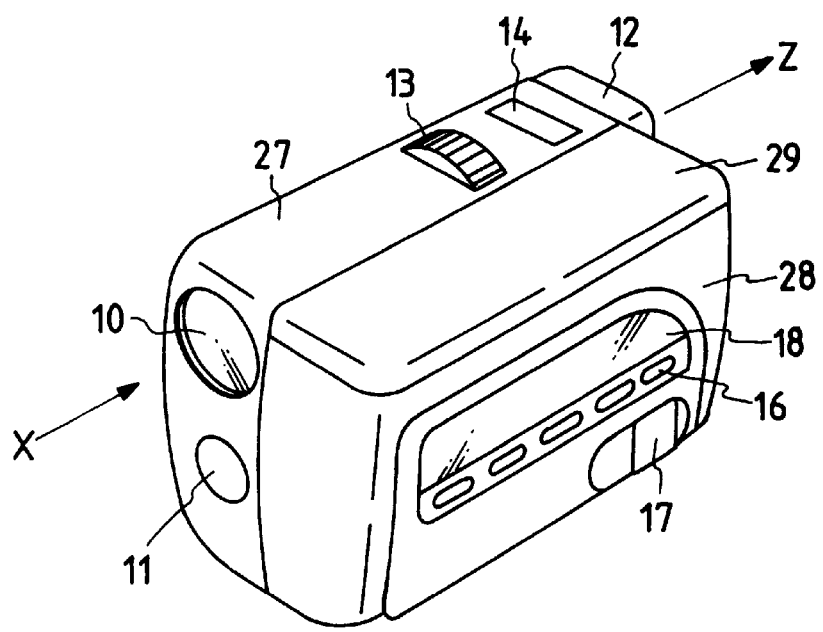
FIG. 17 is a perspective view of the embodiment shown in FIG. 16, showing the front, top, and right side thereof.
Figure 18:
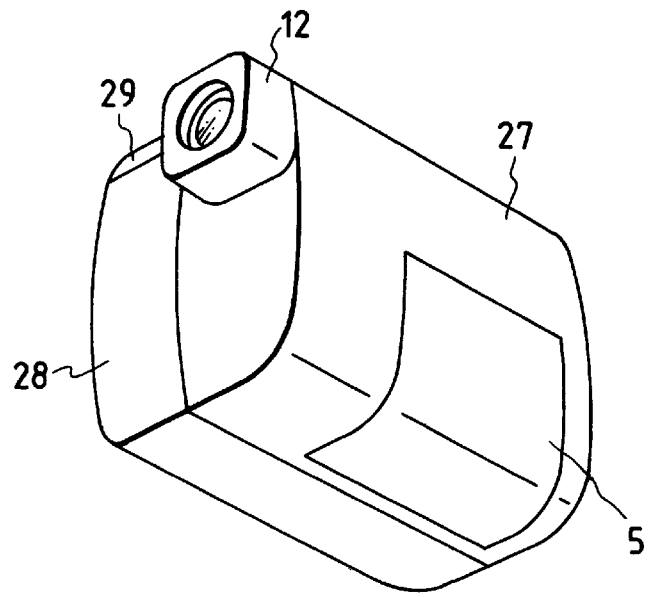
FIG. 18 is a perspective view of the embodiment shown in FIG. 16, showing the rear, bottom, and left side thereof.

Next, the appearance of this embodiment will be explained with reference to FIGS. 17 and 18. The housing of the main body 1 is comprised of the housings 27, 28, and 29 and the battery unit 5 which can be freely mounted or removed. As viewed from the direction of the optical axis X of the camera, the lens 10 and the mike 11 are arranged on the front of the main body 1, and the operation switch 16 which is changed to a video switch or a camera switch by the video/camera changing button 17 and the display unit 18 are arranged on the right side, and the rotary zooming knob 13 and the start/stop button 14 are arranged on the top, and the eye cup 12 is arranged on the back. The battery unit 5 can be inserted from the bottom of the main body 1.

Figure 20A:
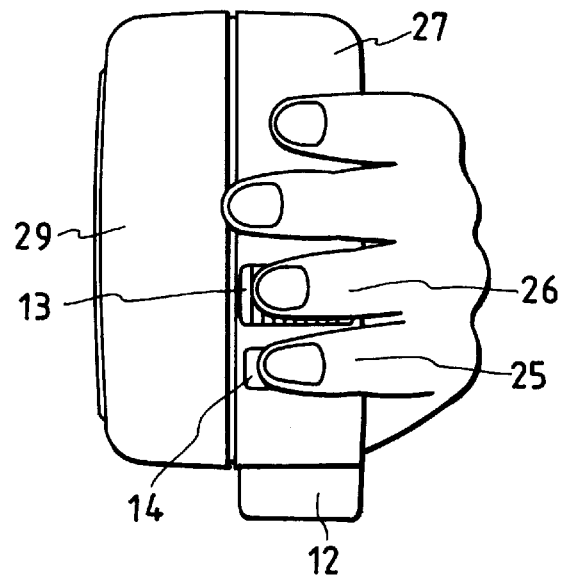
FIGS. 20(a) and 20(b) are drawings for explaining the use status of the embodiment shown in FIG. 16.
Figure 20B:
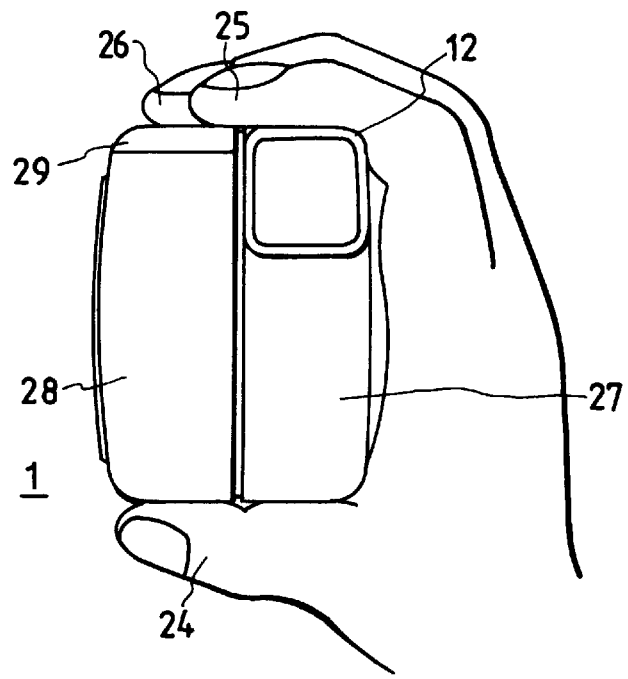

Next, the supporting and operating method for the main body for imaging will be explained with reference to FIGS. 20(a) and 20(b). FIG. 20(a) is an illustration for the use status as viewed from the top and FIG. 20(b) is an illustration for the use status as viewed from the operator side. In this embodiment, the bottom of the housing 28 is supported by the thumb 24 and the main body 1 is held by the other fingers. For imaging, the start/stop button 14 is operated by the forefinger 25 and the zooming button 13 is operated by the middle finger 26.

Figure 50:
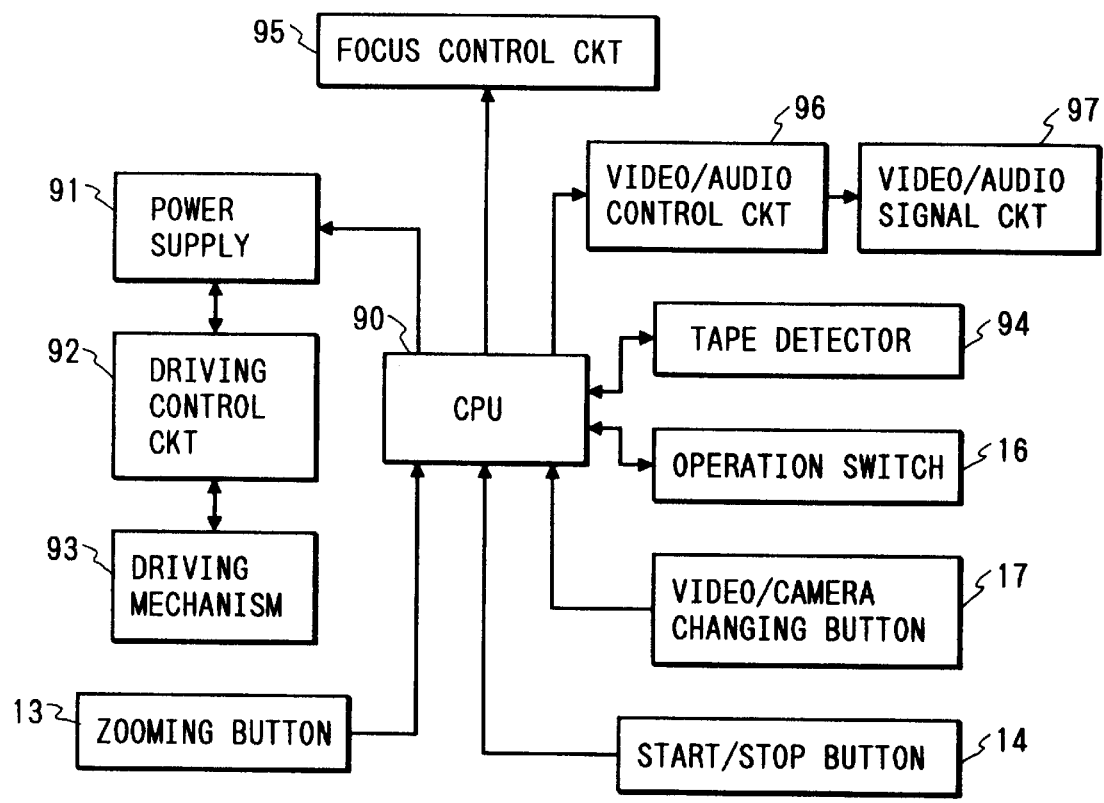
FIG. 50 is a block diagram showing the circuit configuration of the essential section of the first embodiment of the present invention.

The tape cassette 22 is loaded or unloaded as shown in FIG. 4 and FIGS. 45 to 48 and the circuit configuration is the same as that shown in FIG. 50.

As mentioned above, according to this embodiment, the main body 1 can be formed in a box shape with the longer side at the top which is short in height and almost even as viewed from the direction of the optical axis X of the camera, and the entire arrangement is good, and the design is satisfactory, and the storing capability and operability are superior. Furthermore, since the eye cup 12 is arranged behind the lens 10, imaging can be performed by confirming the imaging status on the prolonged line of the optical axis X of the camera during light incidence.

Furthermore, a conventional video camera requires a support belt for holding the main body 1 for imaging. However, in this embodiment, the main body 1 is held directly by hand, so that the support belt which is obstructive for storing is not necessary.

[Fifth embodiment]

FIGS. 21 to 26 show a video camera combined with a VTR according to the fourth embodiment of the present invention. Members, locations, and arrows which are equal or equivalent to those shown in FIGS. 1 to 20 and FIGS. 45 to 50 are indicated by the same reference numerals and duplicated explanations are omitted.

Figure 21:
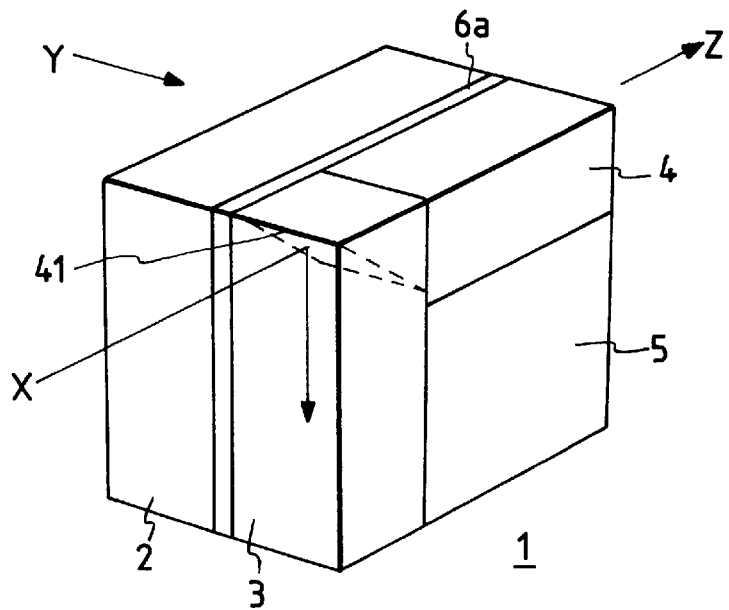
FIG. 21 is a perspective view showing the general structure of a fifth embodiment of the present invention.

In FIG. 21, the deck unit 2 is arranged so that a direction perpendicular to the widest surface of the flat deck unit 2 is transverse and the longitudinal direction thereof is horizontal as viewed from the direction of the optical axis X of the camera. On the right of the deck unit 2, the camera unit 3 having an optical axis changing means 41 for changing the optical axis X of the camera is arranged on the front so that the longitudinal direction is vertical, and the viewfinder unit 4 is arranged on the backward upper part so that the longitudinal direction is horizontal, and the battery unit 5 is arranged on the backward lower part so that the longitudinal direction is horizontal under the condition that the units are in line with each other, and as viewed from the direction (direction of the arrow Y) perpendicular to the widest surface of the flat deck unit 2, the camera unit 3, the viewfinder unit 4, and the battery unit 5 are arranged so that they are set almost in the projection area of the widest surface of the flat deck unit 2. A reference numeral 6a denotes a printed circuit board arranged between the deck unit 2 and the camera unit 3, viewfinder unit 4, and battery unit 5.

Figure 24:
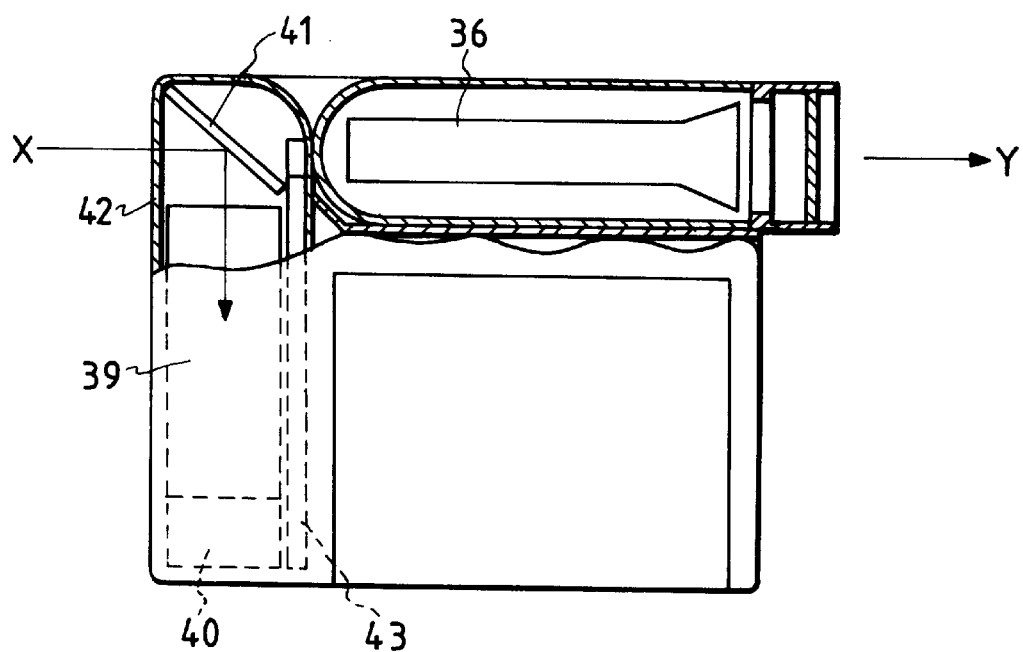
FIG. 24 is a side view with a partial section of the embodiment shown in FIG. 21.

The camera unit 3 is structured, as shown in FIG. 24, such that the lens block 39 having the imaging unit 40 at the bottom thereof is arranged with the optical axis of the lens (not shown in the drawing) up and the camera optical axis changing means 41 formed by a mirror is arranged above the above lens block 39. By this structure, the camera optical axis X incident on the camera unit 3 is refracted at 90° downward by the camera optical axis changing means 41.

In FIG. 24, a reference numeral 42 denotes a camera window, 43 a camera printed circuit board, and 36 a viewfinder cathode-ray tube.

Figure 22:
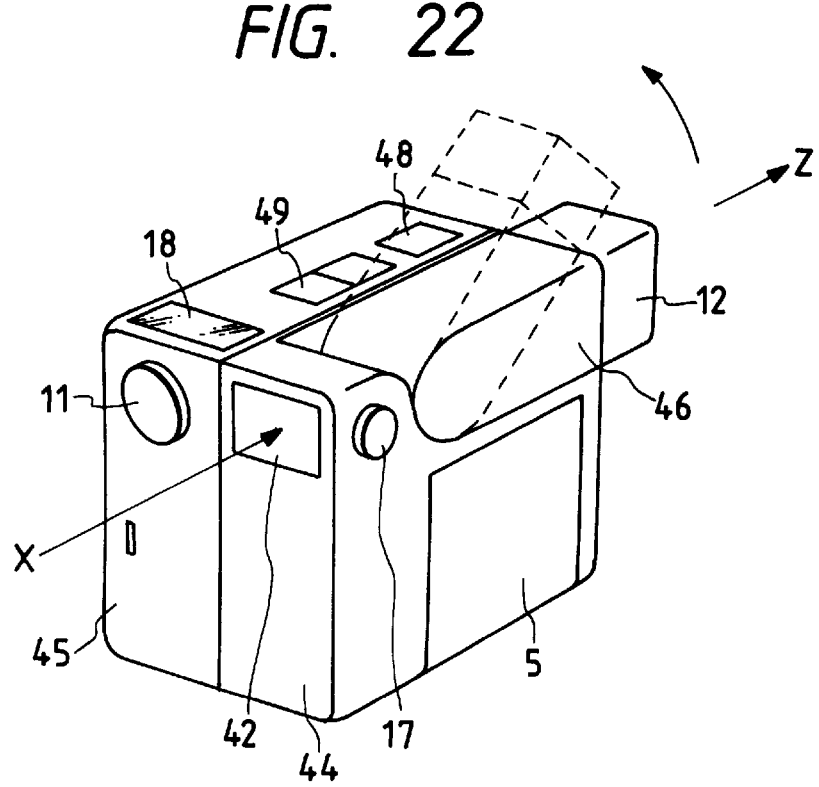
FIG. 22 is a perspective view of the embodiment shown in FIG. 21, showing the front, top, and right side thereof.
Figure 23:
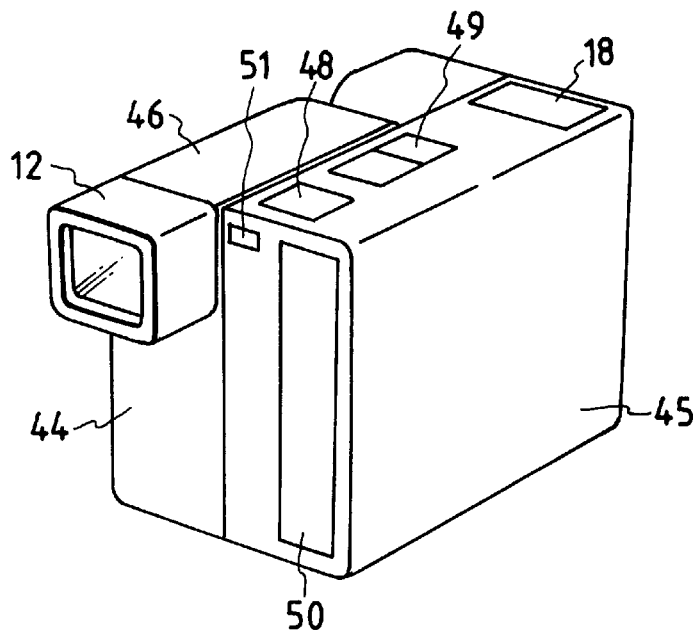
FIG. 23 is a perspective view of the embodiment shown in FIG. 21, showing the rear, bottom, and left side thereof.
Figure 25:
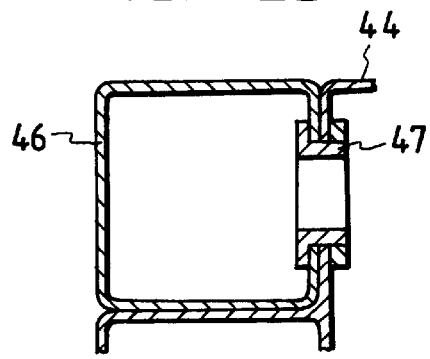
FIG. 25 is a sectional view of the rotation shaft of the viewfinder unit of the embodiment shown in FIG. 21.

Next, the appearance of this embodiment will be explained with reference to FIGS. 22, 23, and 24. A reference numeral 44 denotes a housing for covering the camera unit 3, 45 a housing for covering the deck unit 2, and 46 a housing for covering the viewfinder unit 4. The housing of the main body 1 is comprised of the housings 44, 45, and 46 and the battery unit 5 which can be freely mounted or removed. The housing 46 is mounted to the housing 44 via a shaft member 47 so that it can rotate freely as shown in FIG. 25. The viewfinder unit 4 is wired via the opening of this shaft member 47.

As viewed from the direction of the optical axis X of the camera, the camera window 42 and the mike 11 are arranged on the front of the main body 1, and an operation button 48 which is changed to a reproduction switch or a start/stop button by operating the video/camera changing button 17, an operation button 49 which serves both as a rewinding/fast feed button and a zooming button, and the display unit 18 are arranged on the top, and a tape cassette insertion port 50 for inserting the cassette tape 22 from the back of the main body 1 and an eject button 51 are arranged on the back. Since the deck unit 2 of this embodiment is structured so that it is as close to the size of the widest surface of the flat tape cassette 22 as possible as shown in FIG. 48 when the tape cassette 22 is loaded in the same way as with the previous embodiment, the rotary head 85 gets into, or engages, the tape cassette 22 with tape wound. The eye cup 12 which can be freely mounted or removed is installed behind the housing 46. The battery unit 5 is inserted from the bottom of the main body 1.

Figure 26:
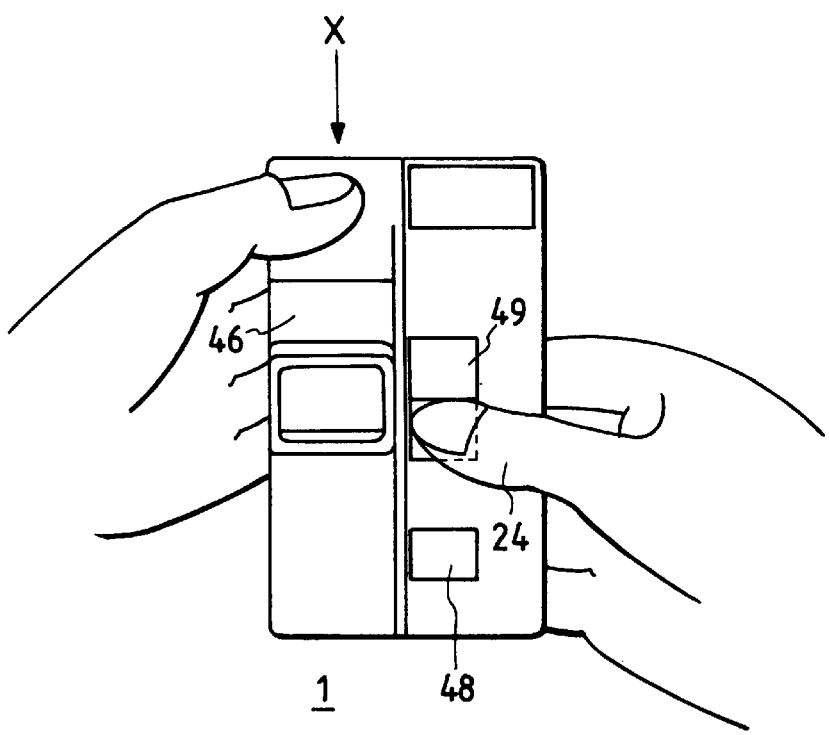
FIG. 26 is a drawing for explaining the use status of the embodiment shown in FIG. 21.

Next, the supporting and operating method for the main body for imaging will be explained. The supporting and operating method in this embodiment is the same as that shown in FIG. 20. However, since the viewfinder unit 4 can be freely rotated, for imaging at a low angle, the main body 1 can be supported by the left hand and the operation buttons 48 and 49 can be operated by the thumb 24 of the right hand, for example, as shown in FIG. 26.

As mentioned above, according to this embodiment, the main body 1 can be formed in a box shape with the longer side at the top which is short in height and almost even as viewed from the direction of the optical axis X of the camera, and the entire arrangement is good, and the design is satisfactory, and the storing capability and operability are superior. Furthermore, since the eye cup 12 is arranged behind the camera window 42, imaging can be performed by confirming the imaging status on the prolonged line of the optical axis X of the camera during light incidence.

Furthermore, a conventional video camera requires a support belt for holding the main body 1 for imaging. However, in this embodiment, the main body 1 is held directly by hand, so that the support belt which is obstructive for storing is not necessary. Furthermore, since the viewfinder unit 3 can be rotated freely and the operation buttons 48 and 49 are arranged on the top, imaging at the eye level as well as at a low angle can be performed satisfactorily.

Furthermore, the operation buttons 48 and 49 can be used both as a video (reproducing) and a camera (imaging) button by operating the video/camera changing button 17, so that the number of parts can be reduced and the operability can be improved.

Furthermore, the cassette tape 22 is inserted from the back of the main body 1, so that the video camera can be structured so that it has few movable parts and the housing can be made strong.

[Sixth embodiment]

Figure 27:
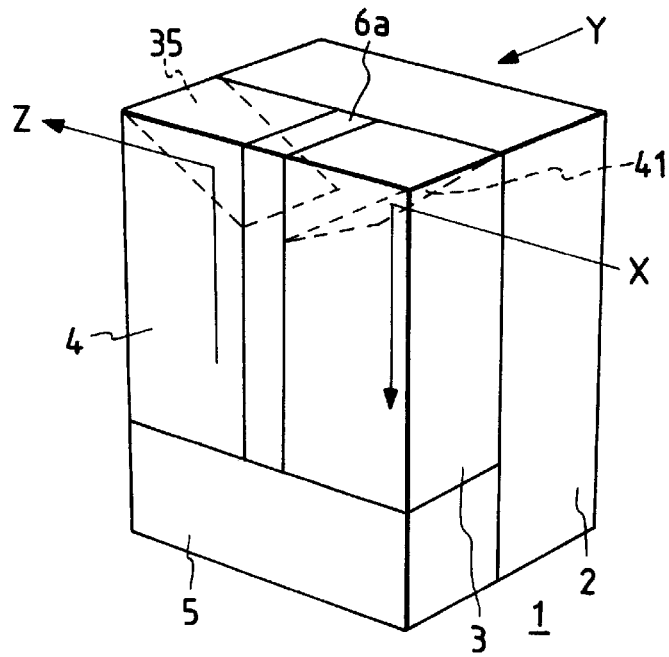
FIG. 27 is a perspective view showing the general structure of a sixth embodiment of the present invention.
Figure 28:
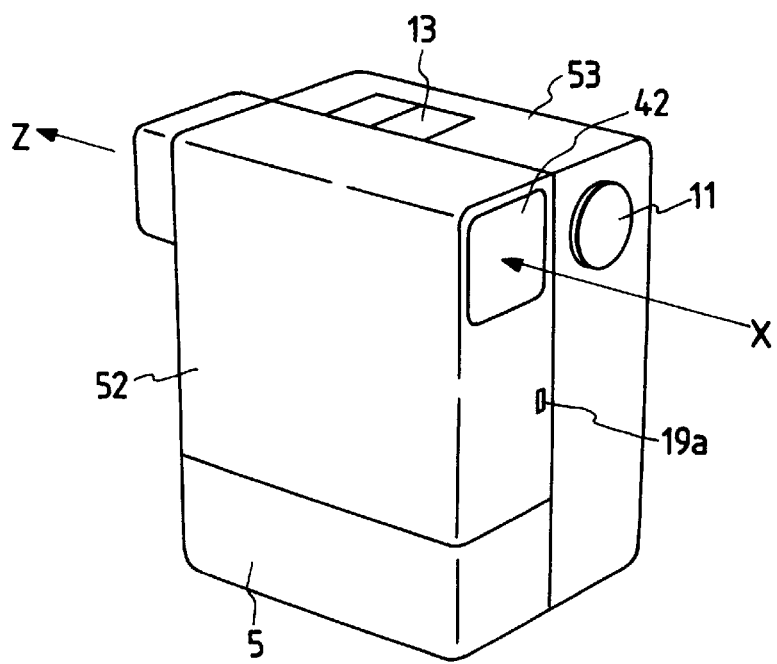
FIG. 28 is a perspective view of the embodiment shown in FIG. 27, showing the front, top, and left side thereof.
Figure 29:
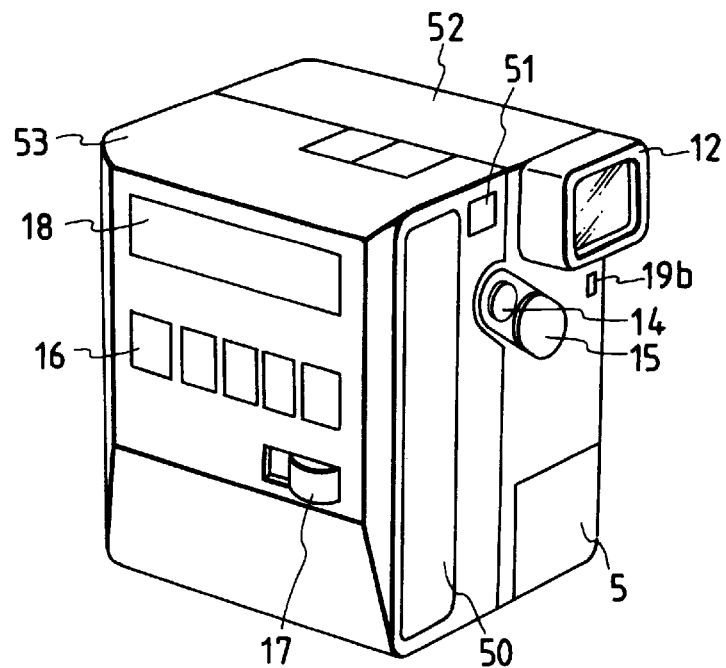
FIG. 29 is a perspective view of the embodiment shown in FIG. 27, showing the rear, bottom, and right side thereof.

FIGS. 27 to 29 show a video camera combined with a VTR according to the sixth embodiment of the present invention. Members, locations, and arrows which are equal or equivalent to those shown in FIGS. 1 to 26 and FIGS. 45 to 50 are indicated by the same reference numerals and duplicated explanations are omitted.

In FIG. 27, the deck unit 2 is arranged so that a direction perpendicular to the widest surface of the flat deck unit 2 is transverse and the longitudinal direction thereof is vertical as viewed from the direction of the optical axis X of the camera. On the left of the deck unit 2 as viewed from the direction of the optical axis X of the camera, the camera unit 3 having the camera optical axis changing means 41 is arranged on the forward upper part so that the longitudinal direction is vertical, and the viewfinder unit 4 having the viewfinder optical axis changing means 35 is arranged on the backward upper part so that the longitudinal direction is vertical, and the battery unit 5 is arranged on the lower part so that the longitudinal direction is horizontal under the condition that the units are in line with each other, and as viewed from the direction (direction of the arrow Y) perpendicular to the widest surface of the flat deck unit 2, the camera unit 3, the viewfinder unit 4, and the battery unit 5 are arranged so that they are set almost in the projection area of the widest surface of the flat deck unit 2. The camera unit 3 and the viewfinder unit 4 have the same structures as those shown in FIGS. 19 and 24 and refract the camera optical axis X and the viewfinder optical axis Z at 90°. The printed circuit board 6a is arranged between the camera unit 3 and the viewfinder unit 4.

Next, the appearance of this embodiment will be explained with reference to FIGS. 28 and 29. A reference numeral 52 denotes a housing for covering the camera unit 3 and the viewfinder unit 4 and 53 a housing for covering the deck unit 2. The housing of the main body 1 is comprised of the housings 53 and 54 and the battery unit 5 which can be freely mounted or removed.

As viewed from the optical axis direction of the camera, the camera window 42 and the mike 11 are arranged on the front of the main body 1, and the zooming button 13 is arranged on the top, and the display unit 18, the operation switch 16, and the video/camera changing button 17 are arranged on the right side, and the cassette tape insertion port 50, the eject button 51, the start/stop button 14, the lock button 15, and the eye cup 12 are arranged on the back. Furthermore, the metal fittings 19a and 19b for the supporting belt 23 are arranged before and behind the main body 1. The battery unit 5 is inserted from the bottom of the main body 1.

The supporting and operating method for the main body 1 for imaging in this embodiment is the same as that shown in FIGS. 6(a) and 6(b).

As mentioned above, according to this embodiment, the main body 1 can be formed in a box shape with the shorter side at the top which is short in the longitudinal length, almost even, and slim as viewed from the direction of the optical axis X of the camera, and the entire arrangement is good, and the design is satisfactory, and the storing capability and operability are superior. Furthermore, since the optical axis changing means 41 and 35 are arranged in the camera unit 3 and the viewfinder unit 4 respectively, imaging can be performed by confirming the imaging status on the prolonged line of the optical axis X of the camera during light incidence.

[Seventh embodiment]

FIGS. 30 to 33 show a video camera combined with a VTR according to the seventh embodiment of the present invention. Members, locations, and arrows which are equal or equivalent to those shown in FIGS. 1 to 29 and FIGS. 45 to 50 are indicated by the same reference numerals and duplicated explanations are omitted.

Figure 30:
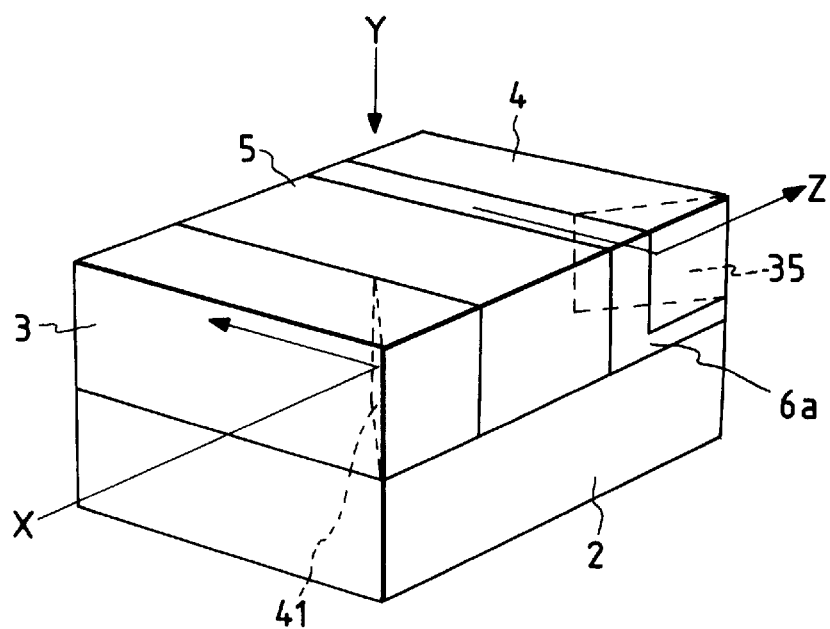
FIG. 30 is a perspective view showing the general structure of a seventh embodiment of the present invention.

In FIG. 30, the deck unit 2 is arranged so that a direction perpendicular to the widest surface of the flat deck unit 2 is vertical and the longitudinal direction thereof is horizontal as viewed from the direction of the optical axis X of the camera. Above the deck unit 2 as viewed from the direction of the optical axis X of the camera, the camera unit 3 having the camera optical axis changing means 41 is arranged on the front, and the battery unit 5 is arranged at the center, and the viewfinder unit 4 having the viewfinder optical axis changing means 35 is arranged on the back so that the longitudinal directions thereof are transverse under the condition that the units are in line with each other, and as viewed from the direction (direction of the arrow Y) perpendicular to the widest surface of the flat deck unit 2, the camera unit 3, the viewfinder unit 4, and the battery unit 5 are arranged so that they are set almost in the projection area of the widest surface of the flat deck unit 2. The camera unit 3 and the viewfinder unit 4 have the same structures as those shown in FIGS. 19 and 24 and refract the camera optical axis X and the viewfinder optical axis Z at 90°. The printed circuit board 6a is arranged between the deck unit 2 and the viewfinder unit 4 and the battery unit 5.

Figure 31:
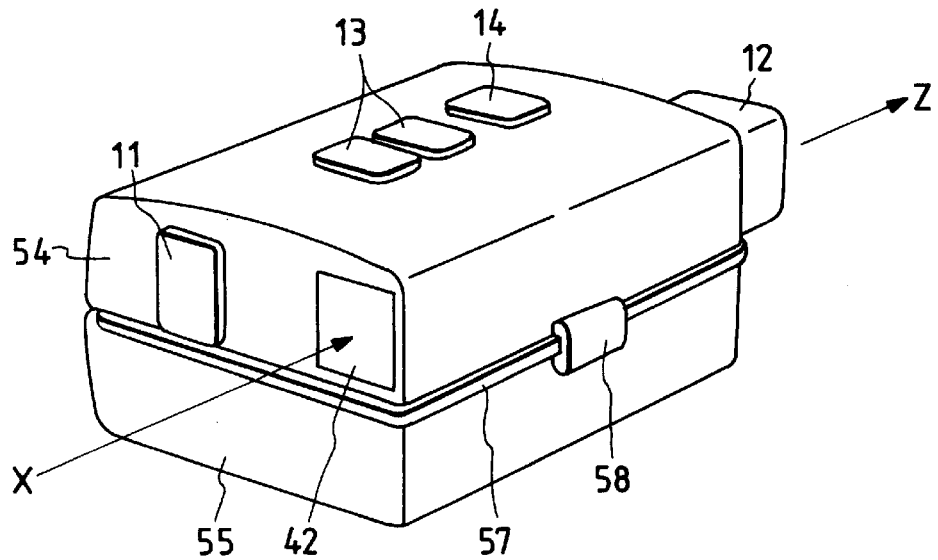
FIG. 31 is a perspective view of the embodiment shown in FIG. 30, showing the front, top, and right side thereof.
Figure 32:
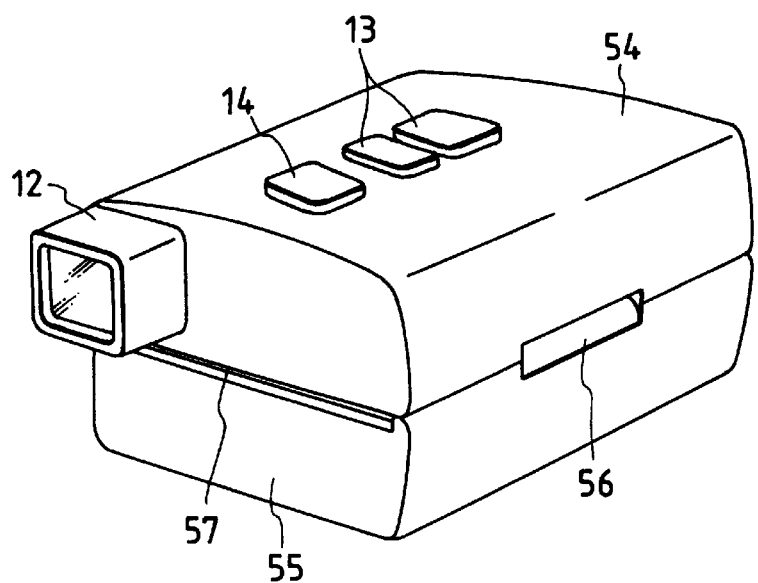
FIG. 32 is a perspective view of the embodiment shown in FIG. 30, showing the rear, bottom, and left side thereof.

Next, the appearance of this embodiment will be explained with reference to FIGS. 31 and 32. A reference numeral 54 denotes a housing for covering the camera unit 3, the viewfinder unit 4, and the battery unit 5 and 55 a housing for covering the deck unit 2. The housings 54 and 55 are born by a connection member 56 so that they can rotate freely. A rubber packing 57 is attached to the periphery of the contact surface between the housings 54 and 55 so as to provide a dust-proof and drip-proof structure. A reference numeral 58 denotes a lock metal part installed on the side opposite to the connection member 56. When it is closed, the housings 54 and 55 are secured. As viewed from the direction of the optical axis X of the camera, the camera window 42 and the mike 11 are arranged on the front of the main body 1, and the eye cup 12 which can be freely mounted or removed is arranged on the back, and the zooming button 13 and the start/stop button 14 are arranged on the top, and the connection parts and surfaces thereof are covered with rubber materials so as to provide a dust-proof and drip-proof structure.

Figure 33:
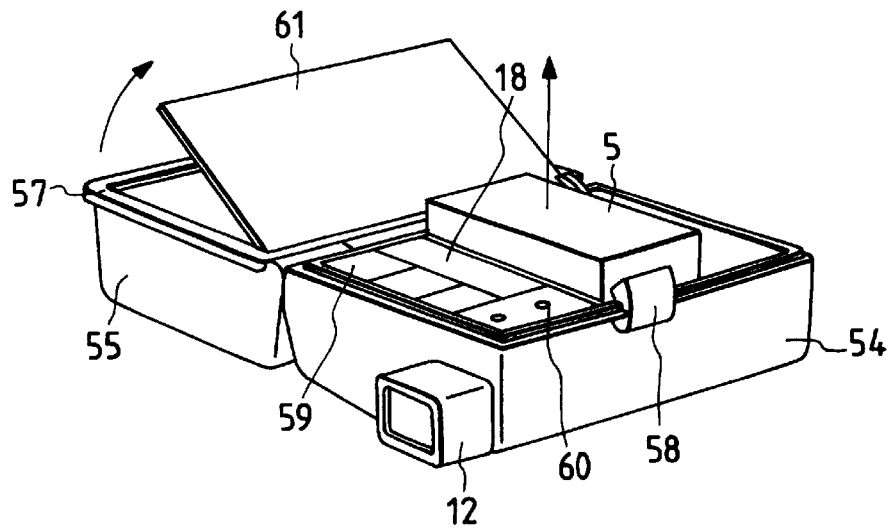
FIG. 33 is a schematic view of the embodiment shown in FIG. 30 with the cover thereof removed.

The appearance of this embodiment with the cover thereof removed will be explained with reference to FIG. 33. Inside the housing 54, the display unit 18, a video operation switch 59, a connector 60, and the battery unit 5 are arranged. The battery unit 5 can be removed from the inside of the housing 54. Furthermore, inside the housing 55, an insertion cover 61 for the cassette tape 22 is arranged and the tape cassette 22 can be loaded or unloaded with the cover removed.

The supporting and operating method for the main body for imaging in this embodiment is the same as that shown in FIGS. 15(a) and 15(b).

As mentioned above, according to this embodiment, the main body 1 can be formed in a thin box shape which is flat and almost even as viewed from the direction of the optical axis X of the camera, and the entire arrangement is good, and the design is satisfactory, and the storing capability and operability are superior. Furthermore, the housings 54 and 55 covers the main body 1 and the video operation switch 59 and the insertion cover 61 are mounted inside the main body 1. Therefore, arranging the rubber packing 57 on the periphery of the contact part provides a dust-proof and drip-proof structure and a secure structure free of damage during movement or storage.

[Eighth embodiment]

FIGS. 34 to 39 show a video camera combined with a VTR according to the eighth embodiment of the present invention. Members, locations, and arrows which are equal or equivalent to those shown in FIGS. 1 to 33 and FIGS. 45 to 50 are indicated by the same reference numerals and duplicated explanations are omitted.

Figure 34:
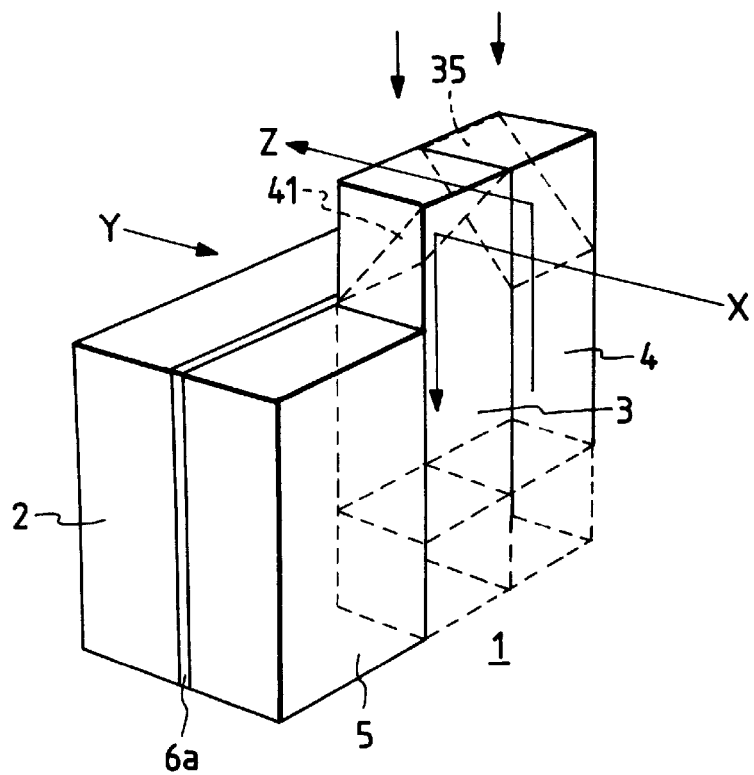
FIG. 34 is a perspective view showing the general structure of an eighth embodiment of the present invention.

In FIG. 34, the deck unit 2 is arranged so that a direction perpendicular to the widest surface of the flat deck unit 2 is horizontal and the longitudinal direction thereof is transverse as viewed from the direction of the optical axis X of the camera. On the front of the deck unit 2 as viewed from the direction of the optical axis X of the camera, the viewfinder unit 4 having the viewfinder optical axis changing means 35 is arranged on the right, and the camera unit 3 having the camera optical axis changing means 41 is arranged at the center, and the battery unit 5 is arranged on the left so that the longitudinal directions thereof are vertical under the condition that the units are in line with each other, and the camera unit 3 and the viewfinder unit 4 are structured so as to slide vertically, and the battery unit 5 is structured so as to be freely mounted or removed. As viewed from the widest surface (the direction of the arrow Y) of the flat deck unit 2 when the camera unit 3 and the viewfinder unit 4 are stored, the camera unit 3, the viewfinder unit 4, and the battery unit 5 are arranged so that they are set almost in the projection area of the widest surface of the flat deck unit 2.

Figure 35:
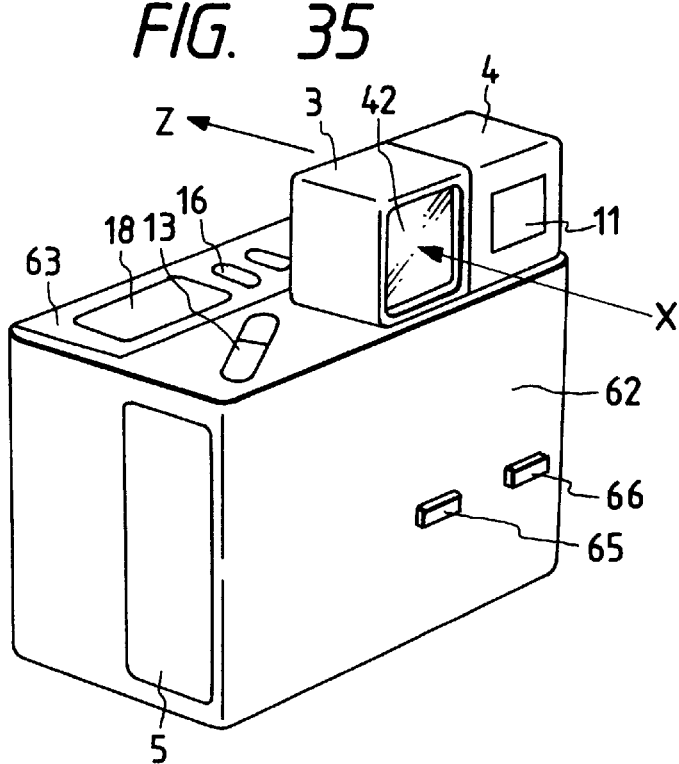
FIG. 35 is a perspective view of the embodiment shown in FIG. 34, showing the front, top, and left side thereof.
Figure 36:
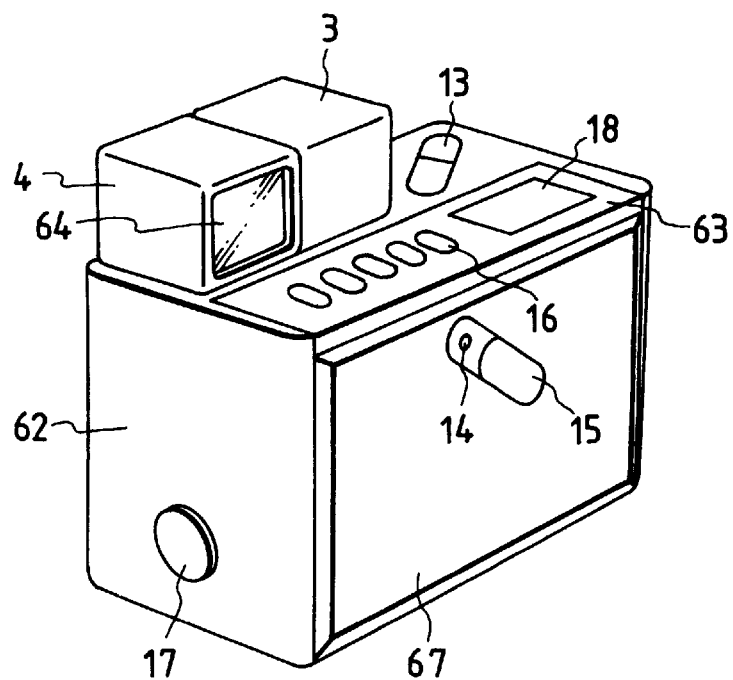
FIG. 36 is a perspective view of the embodiment shown in FIG. 34, showing the rear, top, and right side thereof.
Figure 37:
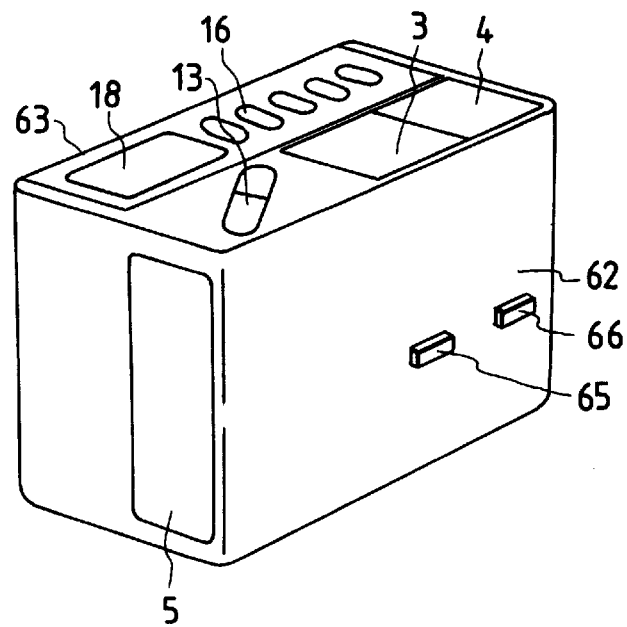
FIG. 37 is a perspective view of the embodiment shown in FIG. 34, showing the shape during no-imaging.

Next, the appearance of this embodiment will be explained with reference to FIGS. 35, 36, and 37. A reference numeral 62 denotes a housing for covering the main body 1 and 63 another housing having the operation switch 16 and the display unit 18. On the right of the front of the top of a housing 61, the camera unit 3 having the camera window 42 which faces the front and the viewfinder unit 4 having the mike 11 facing the front and the viewfinder window 64 facing the back are arranged so that they can be stored freely in the housing 61. Furthermore, on the left of the front of the top, the zooming button 13 is arranged. Furthermore, on the back of the top, the housing 63 is arranged. Reference numerals 65 and 66 on the front denote stopper buttons for allowing the camera unit 3 and the viewfinder unit 4 to be protruded. The camera unit 3 and the viewfinder unit 4 have the same structures as those shown in FIGS. 19 and 24 and refract the camera optical axis X and the viewfinder optical axis Z at 90°. On the left side as viewed from the direction of the optical axis X of the camera, the battery 5 which can be inserted from the side and freely mounted or removed is arranged, and on the right side, the video/camera changing button 17 is arranged. On the back, a cover 67 for inserting the cassette tape 22 which has the start/stop button 14 and the lock button 15 and can be removed or attached is arranged.

Figure 38A:
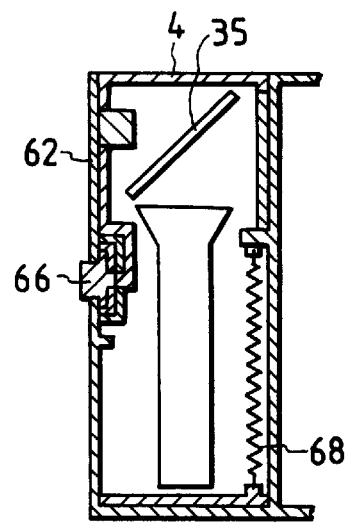
FIGS. 38(a) and 38(b) are sectional views of the viewfinder unit of the embodiment shown in FIG. 34.
Figure 38B:
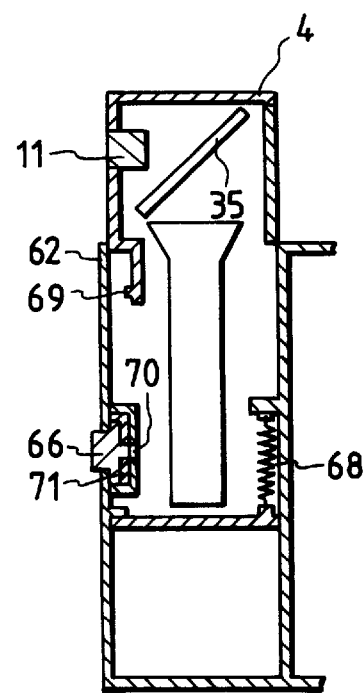

The sliding structure of the viewfinder unit 4 is as shown in FIGS. 38(*a*) and 38(*b*). FIG. 38(*a*) is a drawing when the viewfinder unit 4 is stored and FIG. 38(*b*) is a drawing when the viewfinder unit 4 is protruded. The viewfinder unit 4 is structured so as to be always protruded upward by a coil spring 68. This force is locked when a stopper pawl 69 is fitted into a stopper hole 70. When the viewfinder unit 4 is to be protruded, the back of the stopper button 66 is fitted into the stopper hole 70 by operating the stopper button 66, and the lock state is released by pressing out the stopper pawl 69, and the viewfinder unit 4 is protruded by the coil spring 68. The stopper button 66 is structured 80 as to have force to the outside by a plate spring 71. When the viewfinder unit 4 is to be stored, the stopper 69 is fitted into the stopper hole 70 by pressing in the viewfinder unit 4 and the force is locked. The movable part of the camera unit has the same structure as that of the viewfinder unit.

The mike 11 is arranged in the dead space of the viewfinder optical axis changing means 35 and stored in the housing 61 as the viewfinder unit 4 slides.

Figure 39:
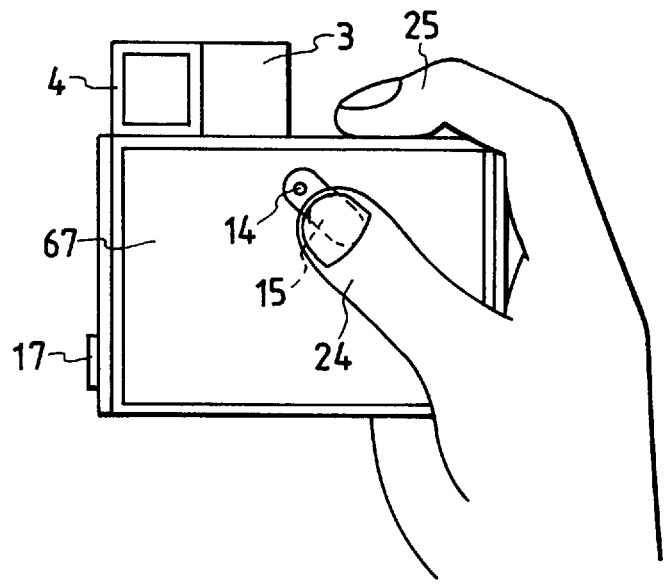
FIG. 39 is a drawing for explaining the use status of the embodiment shown in FIG. 34.

Next, the supporting and operating method for the main body 1 for imaging will be explained with reference to FIG. 39. Firstly, for imaging, the video/camera changing button 17 is switched to VIDEO, and the camera unit 3 and the viewfinder unit 4 are protruded by operating the stopper buttons 65 and 66 so as to allow the video camera to enter the imaging ready state. For imaging, as shown in FIG. 39, the main body 1 is held back and forth by the thumb 24 and the other fingers of the right hand, and the lock button 15 and the start/stop button 14 are operated by the thumb 24, and the zooming button 13 is operated by the forefinger 25.

The tape cassette 22 is loaded or unloaded as shown in FIG. 4 and FIGS. 45 to 48 and the circuit configuration is the same as that shown in FIG. 50.

As mentioned above, in this embodiment, the camera unit 3 and the viewfinder unit 4 are arranged so that they can be mounted freely in the main body 1. Therefore, the video camera can be handled easily during imaging. During non-imaging, that is, during storage or movement, as viewed from the direction (direction of the arrow Y) perpendicular to the widest surface of the flat deck unit 2 (the same as the direction of the optical axis X of the camera), the camera unit 3, the viewfinder unit 4, and the battery unit 5 are arranged so that they are set almost in the projection area of the widest surface of the flat deck unit 2. Therefore, the main body 1 can be formed in a box shape with the longer side at the top which is extremely short in the longitudinal length and almost even, and the entire arrangement is good, and the design is satisfactory, and the storing capability and operability are superior. Furthermore, since the camera window 42, the viewfinder window 64, and the mike 11 can be hidden during no-imaging, the damage during movement or storage can be reduced and a dust-proof effect is obtained. As mentioned above, in this embodiment, the video camera may be formed in a shape like a general still camera.

[Ninth embodiment]

FIGS. 40 to 44 show a video camera combined with a VTR according to the ninth embodiment of the present invention. Members, locations, and arrows which are equal or equivalent to those shown in FIGS. 1 to 39 and FIGS. 45 to 50 are indicated by the same reference numerals and duplicated explanations are omitted.

Figure 40:
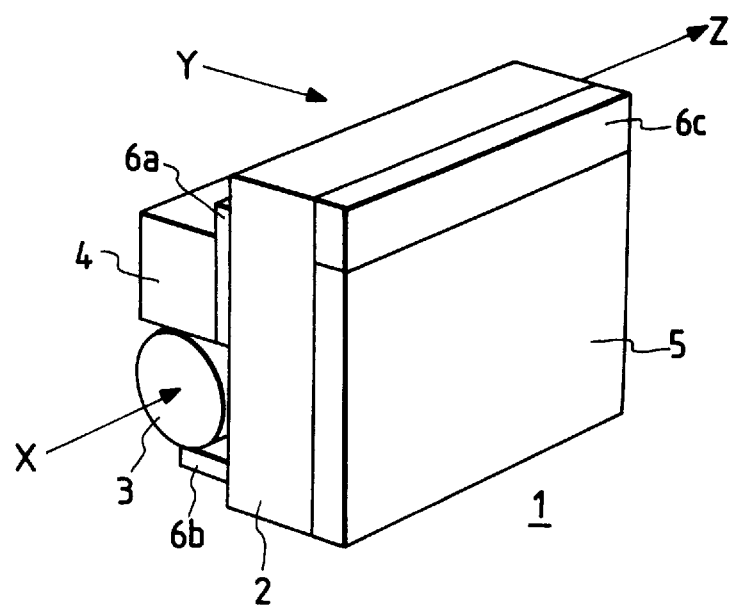
FIG. 40 is a perspective view showing the general structure of a ninth embodiment of the present invention.

First, in FIG. 40, the deck unit 2 is arranged so that a direction perpendicular to the widest surface of the flat deck unit 2 is transverse and the longitudinal direction thereof is horizontal as viewed from the direction of the optical axis X of the camera. The camera unit 3 and the viewfinder unit 4 which is arranged above the camera unit 3 are arranged vertically on the left of the deck unit 2 as viewed from the direction of the optical axis X of the camera so that the longitudinal directions thereof are horizontal under the condition that the units are in line with each other, and the battery unit 5 is arranged on the right of the deck unit 2, and as viewed from the direction (direction of the arrow Y) perpendicular to the widest surface of the flat deck unit 2, the camera unit 3, the viewfinder unit 4, and the battery unit 5 are arranged so that they are set almost in the projection area of the widest surface of the flat deck unit 2. Among the printed circuit boards 6*a*, 6*b*, and 6*c*, the printed circuit board 6*a* is arranged between the deck unit 2 and the viewfinder unit 4, and the printed circuit board 6*b* is arranged under the camera unit 3, and the printed circuit board 6*c* is arranged above the battery unit 5.

Figure 43:
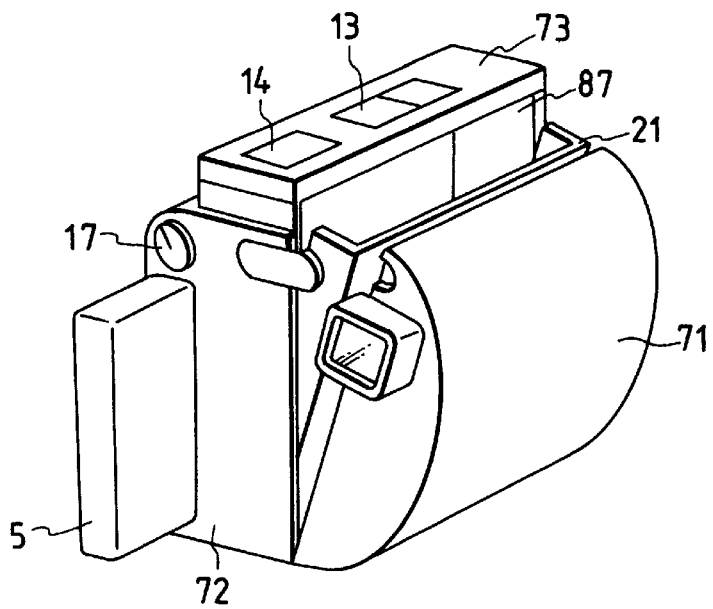
FIG. 43 is a perspective view of the embodiment shown in FIG. 40, showing the shape when the housing is open.
Figure 44:
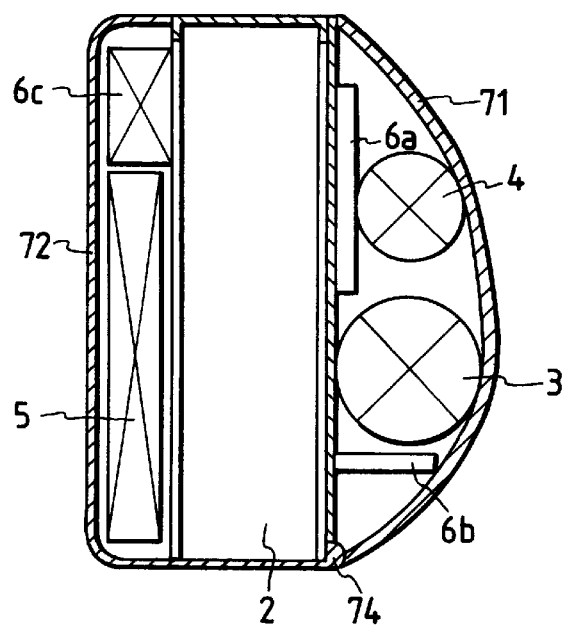
FIG. 44 is a sectional view taken on line A—A of FIG. 42.

In FIG. 43, a reference numeral 71 denotes a housing for covering the camera unit 3 and the viewfinder unit 4 and 72 a housing for covering the deck unit 2 and the battery unit 5. In the drawing, the printed circuit boards 6*a*, 6*b*, and 6*c* are efficiently arranged, so that the total thickness can be minimized, and the dead space is eliminated, and the housings 71 and 72 are structured so as to be almost even. The housing 71 is mounted so that it can rotate freely using the rotation shaft 74 at the bottom as an axis.

Figure 41:
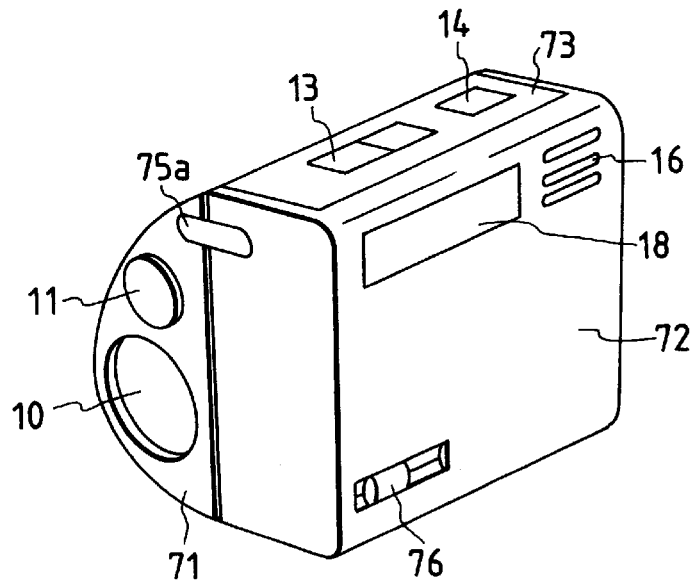
FIG. 41 is a perspective view of the embodiment shown in FIG. 40, showing the front, top, and right side thereof.
Figure 42:
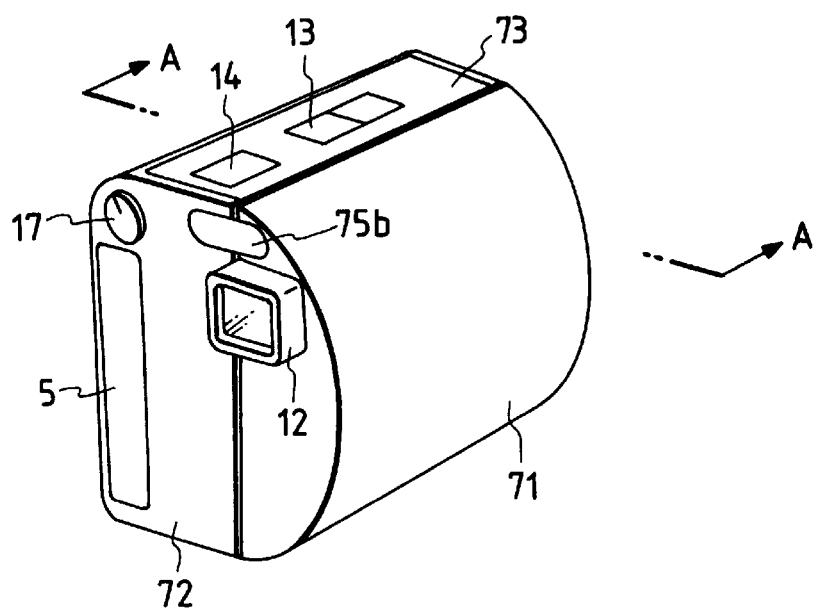
FIG. 42 is a perspective view of the embodiment shown in FIG. 40, showing the rear, top, and left side thereof.

Next, the appearance of this embodiment will be explained with reference to FIGS. 41 and 42. Reference numerals 73 and 72 denote housings for covering the deck unit 2. As viewed from the direction of the optical axis X of the camera, the lens 10 and the mike 11 are arranged on the front of the main body 1, and the display unit 18, the operation switch 16, and a battery removal lever 76 are arranged on the right side, and the zooming knob 13 and the start/stop button 14 are arranged on the top, and the eye cup 12 which can be freely mounted or removed, the video/camera changing button 17, and the battery unit 5 are arranged on the back. Furthermore, stopper levers 75a and 75b for stopping the housings 71 and 72 are arranged on the front and back. The battery unit 5 is formed in a thin card shape and inserted from the back of the main body 1.

Next, loading or unloading of the tape cassette 22 will be explained with reference to FIG. 43. The operation of this structure is the same as that shown in FIG. 4 and FIGS. 45 to 48. Firstly, the stopper levers 75a and 75b are removed and the housing 71 opens using the rotation shaft 74 at the bottom as an axis. The video/camera changing button 17 is operated so as to operate the elevator mechanism 20. By moving up (on the drawing) the elevator plate 87 equipped with the housing 73 by the above elevator mechanism 20, the tape cassette 22 supported to the above elevator plate 87 by the tape cassette guide 21 moves up. When the tape cassette guide 21 moves up, it opens the top thereof, removes the tape reel 89 of the tape cassette from the cassette lid 86, and enters the status shown in FIG. 43 that the cassette can be removed or inserted. To load the cassette tape 22, the tape cassette 22 is loaded into the tape cassette guide 21 and the housing 71 is closed so as to close the tape cassette guide 21, and the tape cassette 22 is loaded by the elevator mechanism 20, and the tape is wound round the rotary head 85.

The supporting and operating method for the main body for imaging is the same as that shown in FIGS. 20(a) and 20(b) and the circuit configuration is the same as that shown in FIG. 50.

As mentioned above, according to this embodiment, the camera unit 3 and the viewfinder unit 4 are arranged on the left of the deck unit 2 which is a grip unit, so that a shape which can be easily supported and handled because it is formed according to the unevenness of the hand is obtained. Furthermore, since the battery unit 5 in a thin card shape is arranged on the right of the deck unit 2, the main body 1 can be formed in a box shape with the longer side at the top which is low in height as a whole, almost even, and compact, and the entire arrangement is good, and the design is satisfactory, and the storing capability and operability are superior.

[Tenth embodiment]

Figure 51:
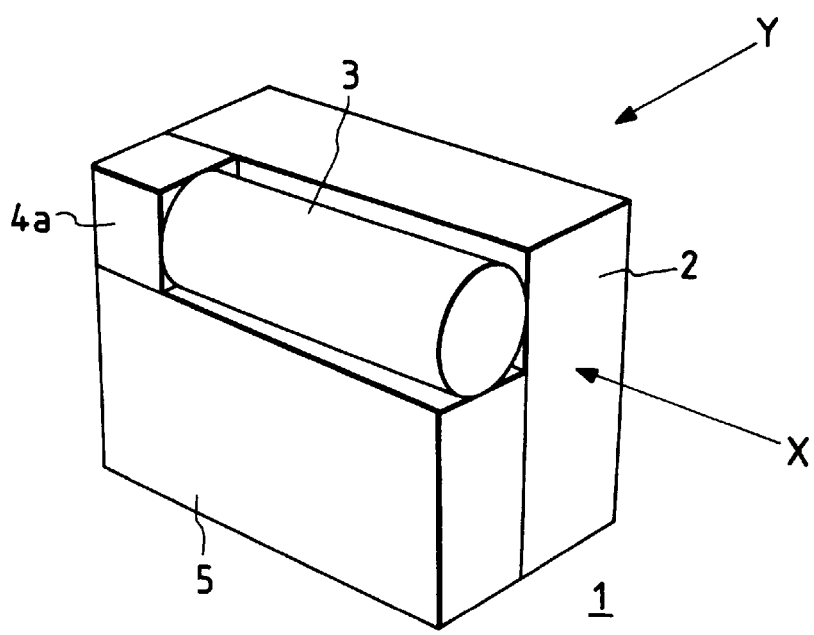
FIG. 51 is a perspective view showing the general structure of a tenth embodiment of the present invention.
Figure 52:
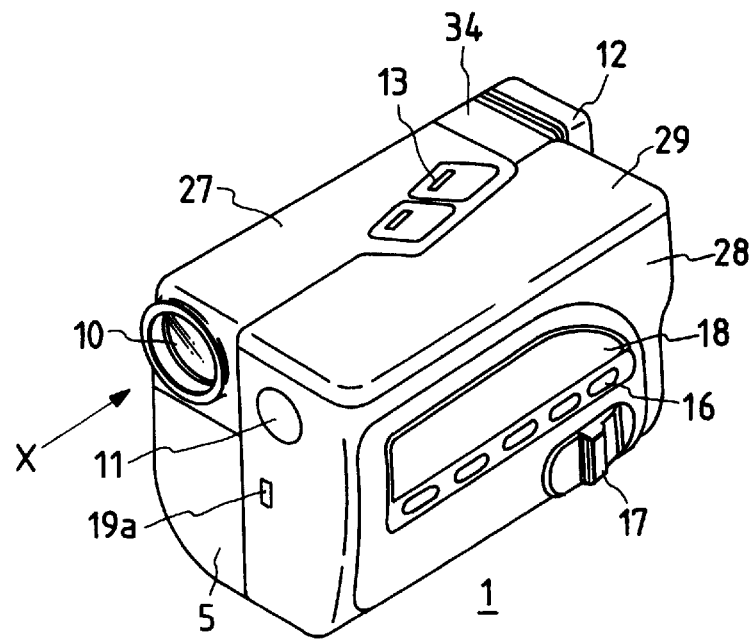
FIG. 52 is a perspective view of the embodiment shown in FIG. 51, showing the front, top, and right side thereof.
Figure 53:
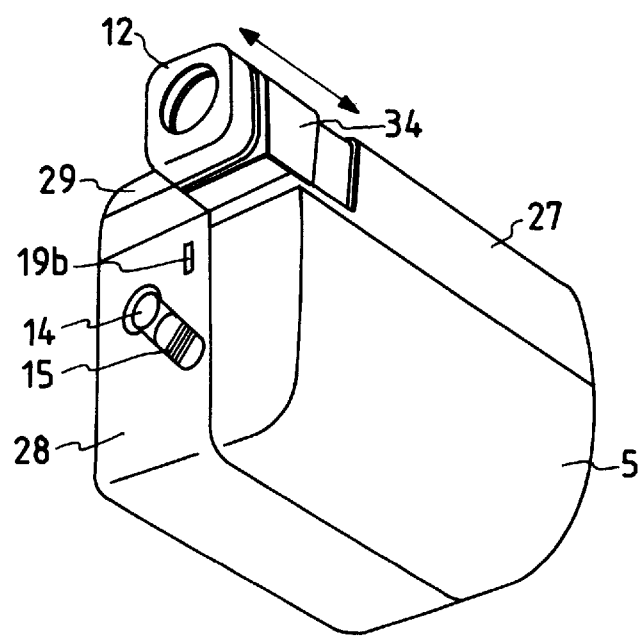
FIG. 53 is a perspective view of the embodiment shown in FIG. 51, showing the rear, bottom, and left side thereof.
Figure 54A:
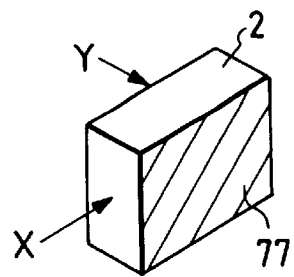
FIG. 54 is a drawing for explaining structures of other embodiments.
Figure 54B:
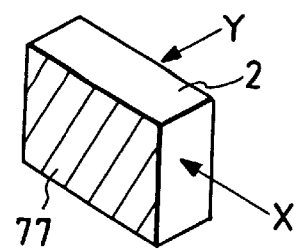
Figure 54C:
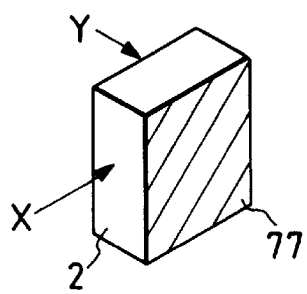
Figure 54D:
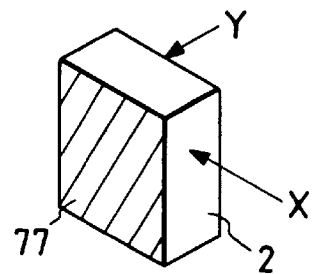
Figure 54E:
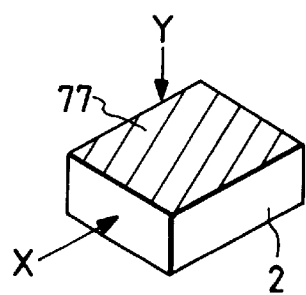
Figure 54F:
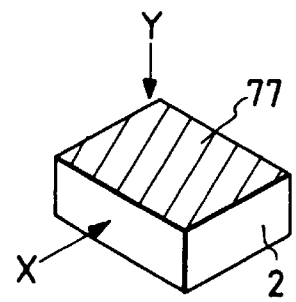
Figure 54G:
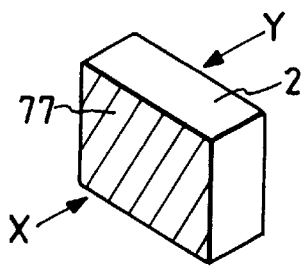
Figure 54H:
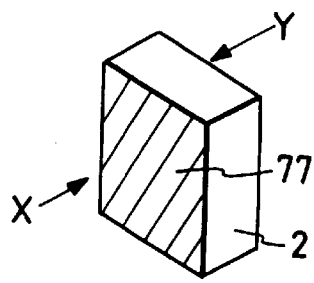

FIGS. 51 to 53 show a video camera combined with a VTR according to the tenth embodiment of the present invention. FIG. 51 is a general arrangement schematic view of the units thereof and FIGS. 52 and 53 are external views of the video camera shown in FIG. 51. Members, locations, and arrows which are equal or equivalent to those shown in FIGS. 1 to 50 are indicated by the same reference numerals and duplicated explanations are omitted.

First, the arrangement of each unit of this embodiment will be explained with reference to FIG. 51. In the drawing, the deck unit 2 is arranged so that a direction perpendicular to the widest surface of the flat deck unit 2 is transverse and the longitudinal direction thereof is horizontal as viewed from the direction of the optical axis X of the camera. The camera unit 3, the thin viewfinder unit 4a having a liquid crystal display device (LCD) arranged behind the camera unit 3, and the battery unit 5 arranged under the camera unit 3 and the viewfinder unit 4a are arranged on the left of the deck unit 2 as viewed from the direction of the optical axis X of the camera, and arranged so that the longitudinal directions of the camera unit 3 and the battery unit 5 are horizontal, and arranged so that as viewed from the direction (direction of the arrow Y) perpendicular to the widest surface of the flat deck unit 2, they are set almost in the projection area of the above surface.

Next, the appearance of this embodiment will be explained with reference to FIGS. 52 and 53. The housing of the main body 1 is comprised of the housings 27, 28, and 29 and the battery unit 5 which can be freely mounted or removed. As viewed from the direction of the optical axis X of the camera, the lens 10 and the mike 11 are arranged on the front of the main body 1, and the video/camera changing button 17, the operation switch 16 which is changed to a video switch or a camera1 switch by the above video/camera changing button 17, and the display unit 18 are arranged on the right side, and the zooming button 13 is arranged on the top, and the eye cup 12, the lock button 15, and the start/stop button 14 are arranged on the back. Furthermore, the metal fittings 19a and 19b for the belt 23 (not shown in the drawing) for supporting the main body 1 is arranged before and behind the main body 1.

The eye cup 12 is mounted to the eye cup mounting part 34, which is mounted behind the viewfinder unit 4a so as to expand or contract freely, so that it can be freely mounted or removed. The eye cup mounting part 34 covers the frame of the viewfinder unit 4 and is structured so as to slide on the frame.

As mentioned above, in this embodiment, the viewfinder unit 4a is comprised of a thin display unit or a LCD and arranged behind the camera unit 3. Therefore, imaging can be performed by confirming an object on the prolonged line of the optical axis X of the camera, and the longitudinal length of the main body 1 can be reduced, and the battery unit 5 can be made larger.

[Other embodiments]

The first embodiment to the tenth embodiment are explained above as embodiments relating to the present invention. However, there are no restrictions on the present invention. Any video camera having a structure that as viewed from the direction (direction of the arrow Y) perpendicular to the widest surface of the flat deck unit 2, the camera unit 3, the viewfinder unit 4, and the battery unit 5 are arranged so that they are set almost in the projection area of the widest surface of the flat deck unit 2 is acceptable.

As shown in FIG. 54, for example, when as viewed from the direction (direction of the arrow Y) perpendicular to the widest surface of the flat deck unit 2, the surface is used as an arrangement surface 77 whereon the camera unit 3, the viewfinder unit 4, and the battery unit 5 are arranged, the same effect is produced in the eight examples shown in the drawing.

In other words, as viewed from the optical axis direction X of the camera:

as shown in Fig. (a), when the deck unit 2 is arranged so that a direction perpendicular to the widest surface of the flat deck unit 2 is transverse and the longitudinal direction thereof is horizontal, the arrangement surface 77 is on the right.

Furthermore, as shown in Fig. (b), when the deck unit 2 is arranged so that a direction perpendicular to the widest surface of the flat deck unit 2 is transverse and the longitudinal direction thereof is horizontal, the arrangement surface 77 is on the left.

Furthermore, as shown in Fig. (c), when the deck unit 2 is arranged so that a direction perpendicular to the widest surface of the flat deck unit 2 is transverse and the longitudinal direction thereof is vertical, the arrangement surface 77 is on the right.

Furthermore, as shown in Fig. (d), when the deck unit 2 is arranged so that a direction perpendicular to the widest surface of the flat deck unit 2 is transverse and the longitudinal direction thereof is vertical, the arrangement surface 77 is on the left.

Furthermore, as shown in Fig. (e), when the deck unit 2 is arranged so that a direction perpendicular to the widest surface of the flat deck unit 2 is vertical and the longitudinal direction thereof is horizontal, the arrangement surface 77 is on the top.

Furthermore, as shown in Fig. (f), when the deck unit 2 is arranged so that a direction perpendicular to the widest surface of the flat deck unit 2 is vertical and the longitudinal direction thereof is transverse, the arrangement surface 77 is on the top.

Furthermore, as shown in Fig. (g), when the deck unit 2 is arranged so that a direction perpendicular to the widest surface of the flat deck unit 2 is horizontal and the longitudinal direction thereof is transverse, the arrangement surface 77 is on the front.

Furthermore, as shown in Fig. (h), when the deck unit 2 is arranged so that a direction perpendicular to the widest surface of the flat deck unit 2 is horizontal and the longitudinal direction thereof is vertical, the arrangement surface 77 is on the front.

A structure that as viewed from the direction (direction of the arrow Y) perpendicular to the widest surface of the flat deck unit 2, the camera unit 3, the viewfinder unit 4, and the battery unit 5 which are arranged on the above arrangement surface 77 are arranged so that they are set almost in the projection area of this surface is acceptable. An arrangement that the camera optical axis X when light is irradiated to the camera unit 3 coincides with the direction of the object and the viewfinder optical axis Z of the viewfinder unit 4 coincides with the direction of the operator finally is acceptable. Therefore, the camera unit 3 and the viewfinder unit 4 arranged on the arrangement surface 77 may be arranged in any way as long as they satisfy the above conditions. For example, the camera unit 3 and the viewfinder unit 4 may have an optical axis changing means such a mirror; that is, both may not have such a means, or only one of them may have it, or both may have it respectively.

Figure 55A:
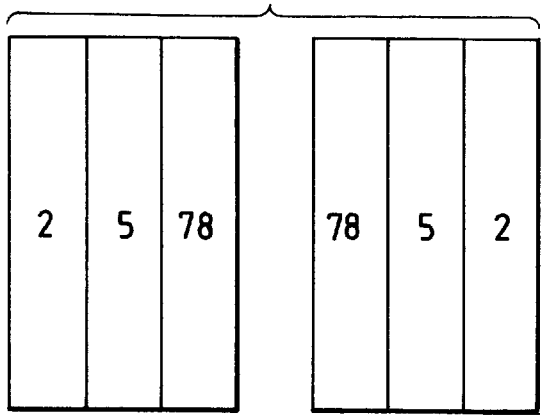
FIGS. 55(a), 55(b), and 55(c) are drawings showing arrangement examples of the essential section of the video camera combined with a recording and reproducing system of the present invention.
Figure 55B:
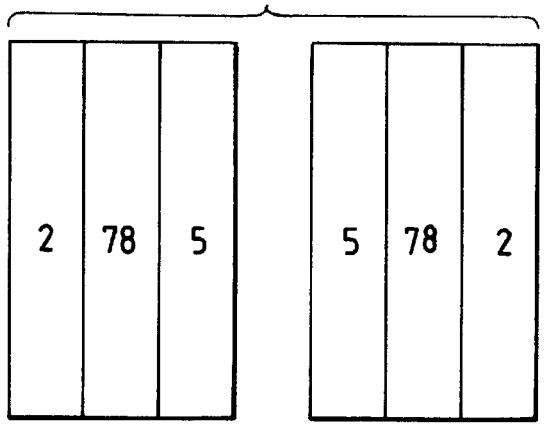
Figure 55C:
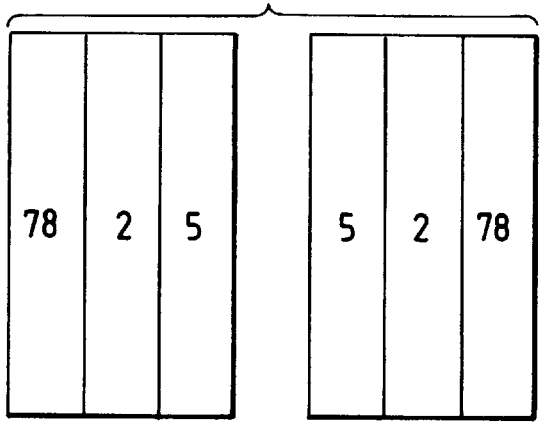

Furthermore, in the present invention, there is no need to mount the above arrangement surface 77 on one side of the deck unit 2. A structure that the camera unit 3, the viewfinder unit 4, and the battery unit 5 are arranged so that they are set almost in the projection area of the widest surface of the flat deck unit is acceptable. For example, as shown in FIGS. 55(*a*), 55(*b*), and 55(*c*), as viewed from the narrow surface of the flat deck unit, it is possible to arrange (a) the battery unit 5 at the center and a block 78 comprising the camera unit 3 and the viewfinder unit 4 on both sides, or (b) the above block 78 at the center and the deck unit 2 and the battery unit 5 on both sides, or (c) the deck unit 2 at the center and the battery unit 5 and the above block 78 on both sides.

In this arrangement, the battery unit 5 can be formed in a thin shape such as a card shape and the video camera can be formed in a more compact shape.

The viewfinder unit 4 in this embodiment uses a cathode-ray tube. However, there are restrictions on it. A thin display unit such as a LCD or a plasma display panel may be used.

As explained in the tenth embodiment, for example, the camera unit 3 with the longitudinal direction being horizontal and the above liquid crystal display panel may be arranged horizontally above the arrangement surface 77 of the deck unit 2 shown in FIG. 54(*a*) and the battery unit 5 may be arranged under the arrangement surface 77. The same may be said with (b) to (h).

In the above explanation, the viewfinder optical axis changing means 35 and the camera optical axis changing means 41 are formed by a mirror respectively. The material thereof may be glass or metal as long as the reflectance thereof is high.

As to the deck unit 2 of this embodiment, a VTR using a magnetic tape cassette as a recording medium is explained. A deck unit having a loading chamber for a removable recording medium such as a magnetic disk or an IC card can produce the same effect as that of this embodiment.

As explained above, a video camera combined with a recording and reproducing system of the present invention is formed in a compact shape (close to the size of a recording medium) which is short in the longitudinal length of the main body and almost even since as viewed from the direction perpendicular to the widest surface of the flat deck unit, the camera unit 3, the viewfinder unit 4, and the battery unit 5 are arranged so that they are set almost in the projection area of this surface and the handling capability and operability for imaging can be improved.

Furthermore, in a video camera combined with a recording and reproducing system which has a shape such that it is different between during imaging and during no-imaging, as viewed from the direction perpendicular to the widest surface of the flat deck unit, the camera unit, viewfinder unit, and the battery unit are set almost in the projection area of the deck unit during no-imaging, so that the video camera can be formed in a compact shape which is extremely operable during imaging and almost even during movement or storage.

Furthermore, according to the present invention, a video camera combined with a recording and reproducing system wherein the appearance is almost even and compact, and the entire arrangement is good, and the design is satisfactory can be produced.

What is claimed is:

1. A video camera combined with a recording and reproducing system comprising:

a recording and reproducing deck unit having a flat shape including a widest surface;

a camera unit having a first optical axis disposed in a first direction;

an optical axis changing means for changing the first optical axis;

a viewfinder unit having a second optical axis; and a battery unit, wherein as viewed from a second direction perpendicular to the widest surface of said recording and reproducing deck unit, said camera unit, said viewfinder unit, and said battery unit are arranged so that they are set substantially in a projection area of said widest surface.

2. The combined video camera and recording and reproducing system according to claim 1, wherein at least said viewfinder unit is mounted to rotate freely.

3. The combined video camera and recording and reproducing system according to claim 1, further comprising an optical axis changing means for changing the second optical axis.

4. The combined video camera and recording and reproducing system according to claim 1, wherein said viewfinder unit is arranged adjacent to said camera unit and includes a liquid crystal display device.

5. The combined video camera and recording and reproducing system according to claim 4, wherein said camera unit and said viewfinder unit are arranged adjacent to each other and to said battery unit.

6. A video camera combined with a recording and reproducing system comprising:

a recording and reproducing deck unit having a flat shape;

a camera unit having a first optical axis;

an optical axis changing means for changing the first optical axis;

a viewfinder unit having a second optical axis; and a battery unit, wherein said combined video camera and recording and reproducing system has a first shape during imaging and a second shape during non-imaging, the first shape being different from the second shape, and wherein as viewed from a direction perpendicular to a widest surface of said recording and reproducing deck unit, said camera unit, said viewfinder unit, and said battery unit are arranged so that they are set substantially in a projection area of said widest surface during non-imaging.

7. The combined video camera and recording and reproducing system according to claim 6, further comprising an optical axis changing means for changing the second optical axis.

* * * * *